(12) United States Patent
Yamaguchi et al.

(10) Patent No.: US 11,230,287 B2
(45) Date of Patent: Jan. 25, 2022

(54) VEHICLE CONTROL DEVICE

(71) Applicant: Mitsubishi Electric Corporation, Tokyo (JP)

(72) Inventors: Shinji Yamaguchi, Hyogo (JP); Toshihide Satake, Tokyo (JP); Yuji Shimizu, Tokyo (JP); Kazuhiro Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 16/549,034

(22) Filed: Aug. 23, 2019

(65) Prior Publication Data

US 2020/0290612 A1    Sep. 17, 2020

(30) Foreign Application Priority Data

Mar. 12, 2019 (JP) .............................. JP2019-044396

(51) Int. Cl.
*B60W 30/14* (2006.01)
*B60W 40/06* (2012.01)
*B60W 50/08* (2020.01)
*B60W 50/00* (2006.01)

(52) U.S. Cl.
CPC .......... *B60W 30/143* (2013.01); *B60W 40/06* (2013.01); *B60W 50/08* (2013.01);
(Continued)

(58) Field of Classification Search
CPC ......... B60W 2050/0072; B60W 50/08; B60W 2552/05; B60W 2552/10; B60W 2552/50;
(Continued)

(56) References Cited

U.S. PATENT DOCUMENTS

| 2004/0030483 A1 | 2/2004 | Muehlbauer |
| 2017/0232967 A1* | 8/2017 | Tomatsu ........... B60W 30/0956 701/117 |

(Continued)

FOREIGN PATENT DOCUMENTS

| DE | 10235363 A1 | 2/2004 |
| DE | 102004048468 A1 | 4/2006 |

(Continued)

OTHER PUBLICATIONS

Communication dated Aug. 26, 2021, from the German Patent and Trademark Office in application No. 102019213415.7.

*Primary Examiner* — Atul Trivedi
(74) *Attorney, Agent, or Firm* — Sughrue Mion, PLLC; Richard C. Turner

(57) ABSTRACT

A vehicle control device disclosed in the present disclosure includes: a first control unit configured to control a speed of the vehicle in accordance with the route distance and the set speed until the detection unit determines that the vehicle has passed through the ETC toll gate, while the vehicle is performing the constant-speed traveling by the cruise control unit; a vehicle frontward detecting unit configured to detect road information about a road frontward of the vehicle; and a second control unit configured to change control content in the cruise control unit on the basis of a detection result from the vehicle frontward detecting unit, when the detection unit determines that the vehicle has passed through the ETC toll gate, while the vehicle is performing the constant-speed traveling by the cruise control unit.

13 Claims, 16 Drawing Sheets

(52) U.S. Cl.
CPC . *B60W 2050/0072* (2013.01); *B60W 2552/05* (2020.02); *B60W 2554/00* (2020.02); *B60W 2720/106* (2013.01)

(58) Field of Classification Search
CPC ......... B60W 2554/00; B60W 2555/60; B60W 30/143; B60W 30/18154; B60W 2720/106; B60W 40/06; B60K 2310/246; B60K 2310/248
USPC .......................................................... 701/93
See application file for complete search history.

(56) References Cited

U.S. PATENT DOCUMENTS

| | | | | |
|---|---|---|---|---|
| 2018/0128635 | A1* | 5/2018 | Nakamura | B60W 30/12 |
| 2018/0222482 | A1* | 8/2018 | Kato | B60W 30/18009 |
| 2019/0064827 | A1* | 2/2019 | Goto | B60W 60/0053 |
| 2019/0077459 | A1* | 3/2019 | Miura | B62D 15/025 |
| 2019/0248368 | A1* | 8/2019 | Kurata | B60W 30/0956 |
| 2019/0354107 | A1* | 11/2019 | Kato | B60W 10/20 |

FOREIGN PATENT DOCUMENTS

| | | | | |
|---|---|---|---|---|
| JP | 2000-168393 A | 6/2000 | | |
| JP | 2004-355145 A | 12/2004 | | |
| KR | 20200036072 A * | 4/2020 | ........... G05D 1/0061 | |
| KR | 102138497 B1 * | 7/2020 | | |
| WO | WO-2018142560 A1 * | 8/2018 | ........... B60W 10/20 | |
| WO | WO-2018142561 A1 * | 8/2018 | ........... G08G 1/0967 | |
| WO | WO-2018142566 A1 * | 8/2018 | ......... G01C 21/3407 | |
| WO | WO-2018142576 A1 * | 8/2018 | ............. G08G 1/165 | |

* cited by examiner

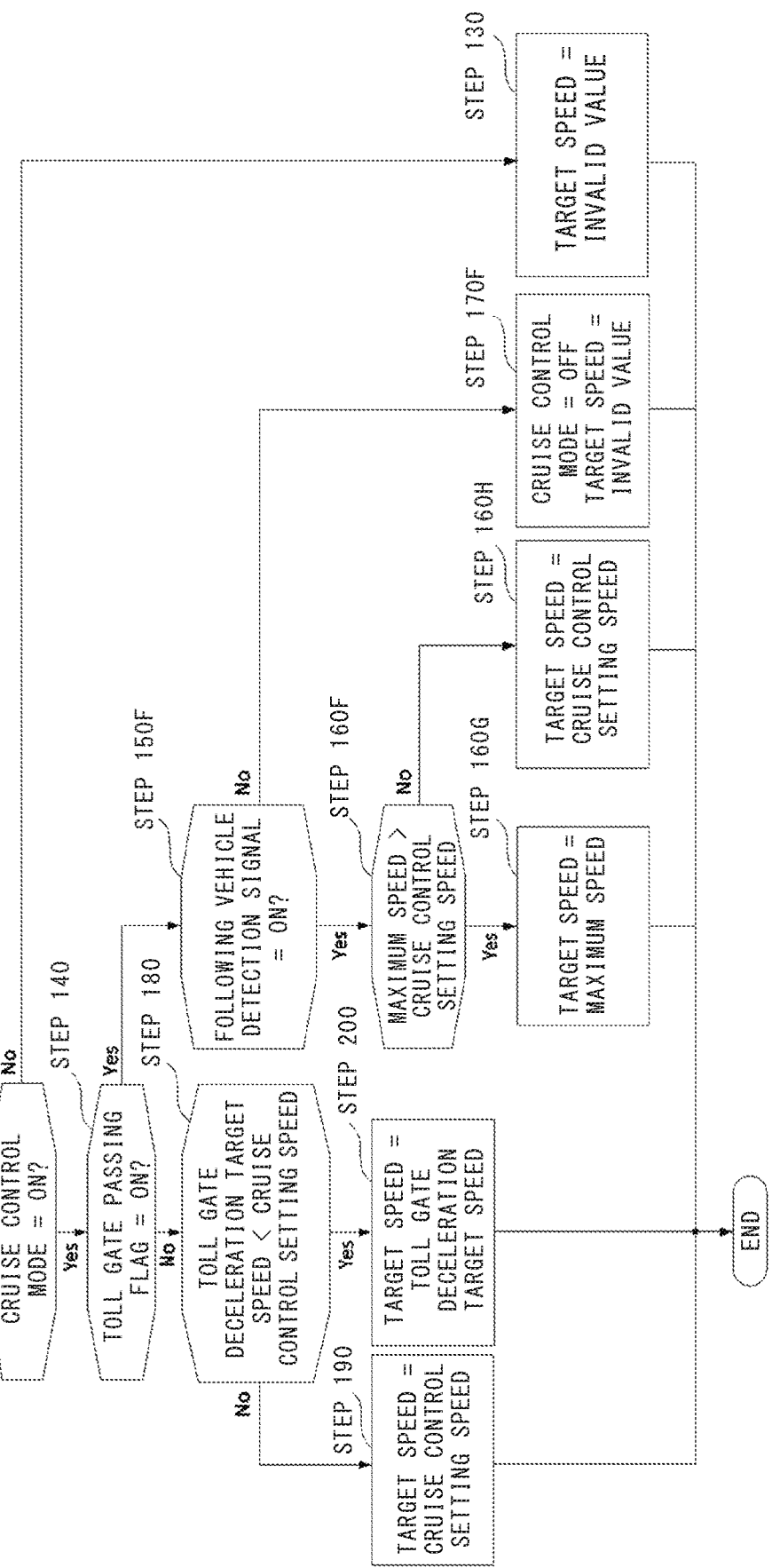

VEHICLE CONTROL DEVICE

BACKGROUND OF THE INVENTION

1. Field of the Invention

The present disclosure relates to a vehicle control device including a cruise control device that causes a vehicle to travel at a constant speed.

2. Description of the Background Art

The configurations and operations of conventional vehicle control devices will be described below.

A vehicle control device disclosed in Patent Document 1 is configured such that, at an ETC toll gate that allows a transaction to be done without a vehicle stopping, a detection unit detects that the vehicle approaches a predetermined area existing near the ETC toll gate. When the detection unit detects that the vehicle has reached the predetermined area, a control unit controls the traveling speed of the vehicle so as to be able to pass through the ETC toll gate at 20 km/h which is recommended in an ETC system, for example.

A vehicle driving assistance device disclosed in Patent Document 2 is configured such that, during traveling at a constant speed by a constant speed traveling device, when a vehicle has passed through a first gate provided just before an ETC toll gate, a first signal is received from the first gate and the vehicle is decelerated so that the vehicle can pass through the ETC toll gate at a speed not higher than a prescribed passing speed. Then, when a third signal indicating that a toll payment procedure is finished at the ETC toll gate is received, the vehicle is accelerated so that the speed of the vehicle becomes the speed just before passing through the first gate.

Patent Document 1: Japanese Laid-Open Patent Publication No. 2004-355145

Patent Document 2: Japanese Laid-Open Patent Publication No. 2000-168393

However, in the conventional vehicle control devices, even if road information such as a lane width and a road type, e.g., a general road or an expressway, is different between before and after passing through the ETC toll gate, the control is continued or canceled irrespective of the road information after the passing. Thus, control in accordance with the road information after the passing cannot be performed.

That is, in the vehicle control device disclosed in Patent Document 1, for example, even if a road after passing through the ETC toll gate is an expressway, the vehicle speed control is canceled after the vehicle passes through the ETC toll gate. Thus, the speed of the vehicle is reduced and stopped, or the vehicle might be rear-ended by a following vehicle. Therefore, a driver needs to accelerate the vehicle by the driver's operation.

In addition, in the vehicle driving assistance device disclosed in Patent Document 2, for example, even if the vehicle having traveled on an expressway at a constant speed in accordance with the cruise control device enters a general road after passing through the ETC toll gate, the vehicle continues to travel at the constant speed in accordance with the cruise control device also after passing through the ETC toll gate, and as a result, the vehicle might exceed the maximum speed on the general road or might rear-end a preceding vehicle. Therefore, a driver needs to decelerate the vehicle by the driver's operation.

SUMMARY OF THE INVENTION

The present disclosure has been made to solve the above problems and an object of the present disclosure is to provide a vehicle control device in which, during traveling at a constant speed by the cruise control device, when a vehicle approaches an ETC toll gate, control is performed with a speed suitable for passing through the ETC toll gate, and when the vehicle has passed through the ETC toll gate, control is performed with a speed in accordance with road information about a road after passing through the ETC toll gate, thereby enabling reduction of load on the driver.

A vehicle control device according to one aspect of the present disclosure includes: a cruise control unit configured to cause a vehicle to perform constant-speed traveling at a set speed; a detection unit configured to detect a position of an ETC toll gate and a route distance from a present position of the vehicle to the ETC toll gate, and determine whether or not the vehicle has passed through the ETC toll gate, on the basis of a result of the detection; a first control unit configured to control a speed of the vehicle in accordance with the route distance and the set speed until the detection unit determines that the vehicle has passed through the ETC toll gate, while the vehicle is performing the constant-speed traveling by the cruise control unit; a vehicle frontward detecting unit configured to detect road information about a road frontward of the vehicle; and a second control unit configured to change control content in the cruise control unit on the basis of a detection result from the vehicle frontward detecting unit, when the detection unit determines that the vehicle has passed through the ETC toll gate, while the vehicle is performing the constant-speed traveling by the cruise control unit.

In the vehicle control device according to one aspect of the present disclosure, during traveling at a constant speed by the cruise control unit, when a vehicle approaches an ETC toll gate, control can be performed with a speed suitable for passing through the ETC toll gate, and when the vehicle has passed through the ETC toll gate, control can be performed with a speed in accordance with road information about a road after passing through the ETC toll gate. Therefore, a driver need not control acceleration/deceleration of the vehicle by the driver's operation, and thus load on the driver can be reduced.

BRIEF DESCRIPTION OF THE DRAWINGS

FIG. 16 is a flowchart showing operation of a target speed determining unit of the vehicle control device according to the sixth embodiment.

DETAILED DESCRIPTION OF THE PREFERRED EMBODIMENTS OF THE INVENTION

First Embodiment

Figure 1:
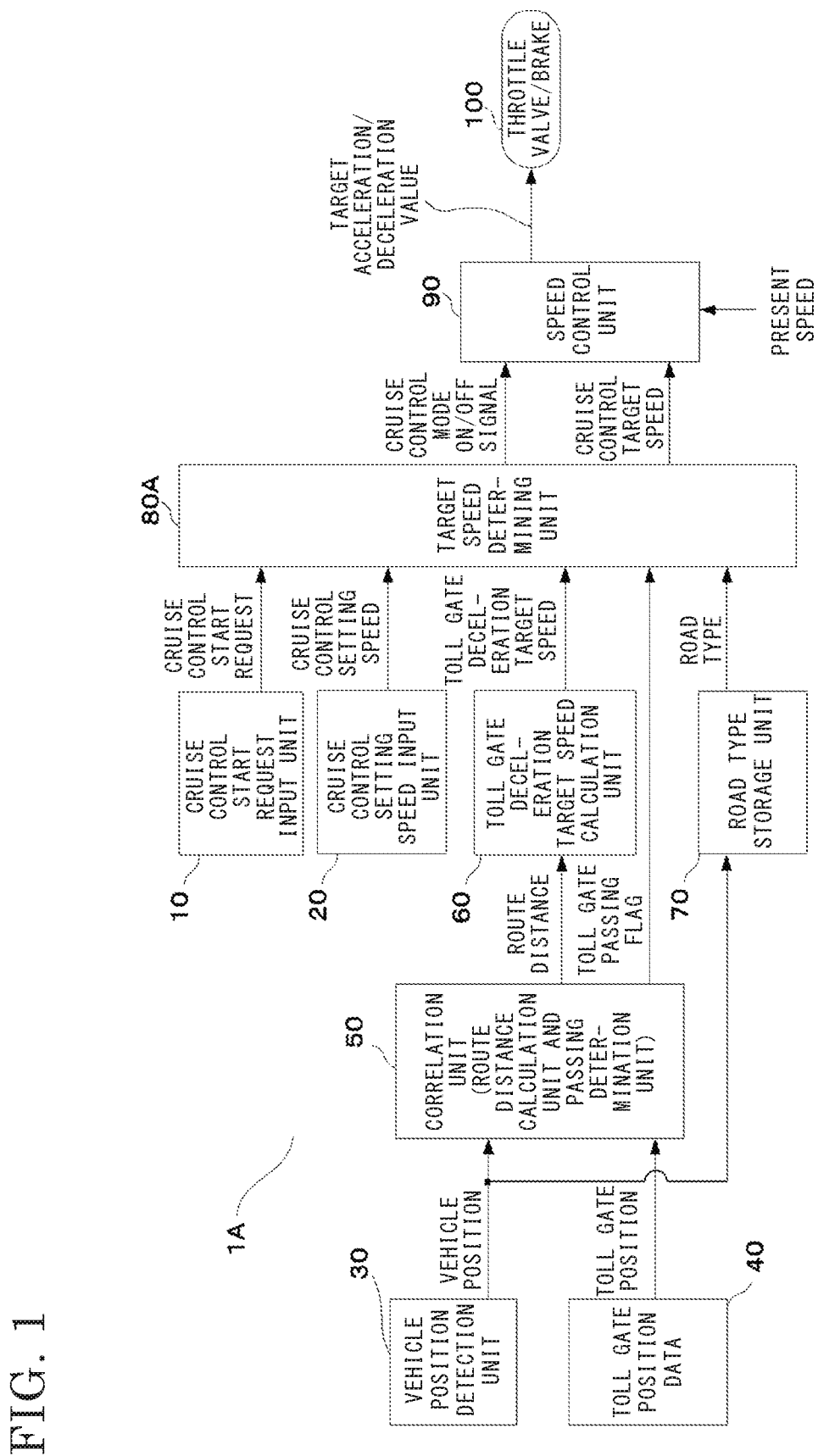
FIG. 1 is a block diagram showing the configuration of a vehicle control device according to the first embodiment of the present disclosure.

A vehicle control device 1A according to the first embodiment of the present disclosure will be described. FIG. 1 is a block diagram showing the configuration of the vehicle control device 1A.

In FIG. 1, a cruise control start request input unit 10 is a switch for inputting a request for starting cruise control from a driver of a vehicle. A cruise control setting speed input unit 20 is for inputting a cruise control setting speed desired by the driver.

A vehicle position detection unit 30 detects the present position (latitude and longitude) of the vehicle provided with the vehicle control device 1A, using positioning information from an artificial satellite such as a global navigation satellite system (GNSS). Toll gate position data 40 is data indicating the position (latitude and longitude) of an ETC toll gate. A correlation unit 50 includes a route distance calculation unit and a passing determination unit, has map information including road shapes and advancing directions, and is capable of calculating the route distance from the vehicle to an ETC toll gate. In addition, the correlation unit 50 is capable of determining whether or not the vehicle has passed through the ETC toll gate. If the correlation unit 50 determines that the vehicle has passed through the ETC toll gate, the correlation unit 50 turns on a toll gate passing flag. If the correlation unit 50 determines that the vehicle has not passed through the ETC toll gate, the correlation unit 50 turns off the toll gate passing flag. The vehicle position detection unit 30, the toll gate position data 40, and the correlation unit 50 correspond to a detection unit in the claims.

A toll gate deceleration target speed calculation unit 60 calculates, on the basis of the route distance from the present position of the vehicle to an ETC toll gate, a target speed (toll gate deceleration target speed) at the present position of the vehicle, in order for the vehicle to pass through the ETC toll gate at an appropriate speed (for example, 20 km/h). A road type storage unit 70 stores road types indicating whether roads are general roads or expressways, and outputs the type of a road after passing through the ETC toll gate, on the basis of the present position of the vehicle. The vehicle position detection unit 30, the toll gate position data 40, the correlation unit 50, and the road type storage unit 70 are integrated in a car navigation device. The road type storage unit 70 corresponds to a vehicle frontward detecting unit in the claims.

A target speed determining unit 80A determines a cruise control mode ON/OFF signal and a final cruise control target speed on the basis of the cruise control start request, the cruise control setting speed, the toll gate deceleration target speed, the toll gate passing flag, and the road type after passing through the ETC toll gate. In the case where the cruise control mode ON/OFF signal is ON, a speed control unit 90 issues a target acceleration/deceleration value to a throttle valve/brake 100 so as to cause the present speed of the vehicle to coincide with the cruise control target speed, thereby automatically adjusting the throttle valve/brake 100 and controlling the speed of the vehicle. The cruise control start request unit 10, the cruise control setting speed input unit 20, a part of the target speed determining unit 80A, and the speed control unit 90 correspond to a cruise control unit in the claims, and the cruise control mode ON/OFF signal and the final cruise control target speed correspond to control content in the cruise control unit in the claims. In addition, the toll gate deceleration target speed calculation unit 60, the target speed determining unit 80A, and the speed control unit 90 correspond to a first control unit in the claims, and the target speed determining unit 80A and the speed control unit 90 correspond to a second control unit in the claims. It is noted that, in the case where the cruise control mode ON/OFF signal is OFF, the vehicle is set to a manual traveling state that is based on an acceleration/brake operation by the driver.

Figure 2:
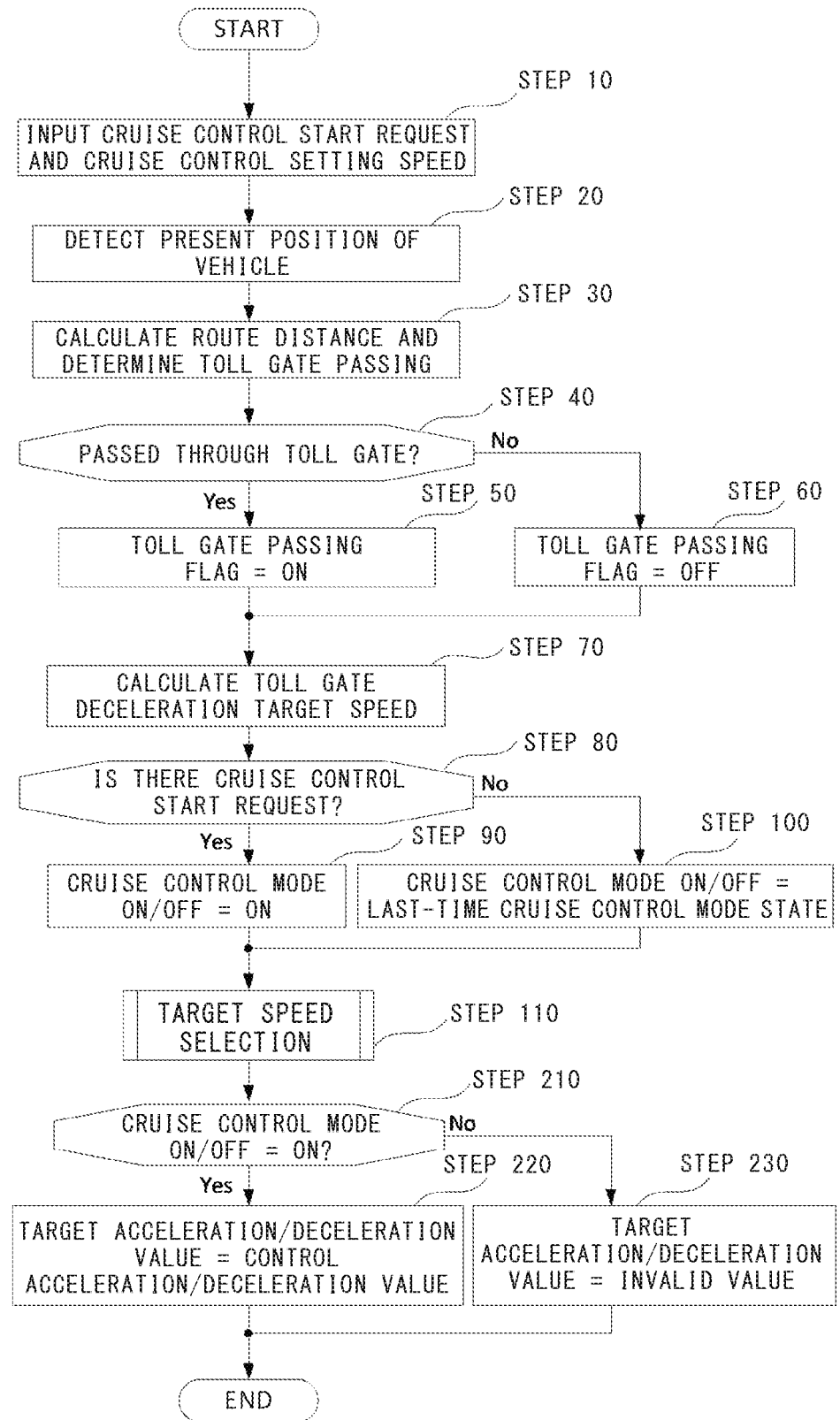
FIG. 2 is a flowchart showing operation of the vehicle control device according to the first embodiment.
Figure 3:
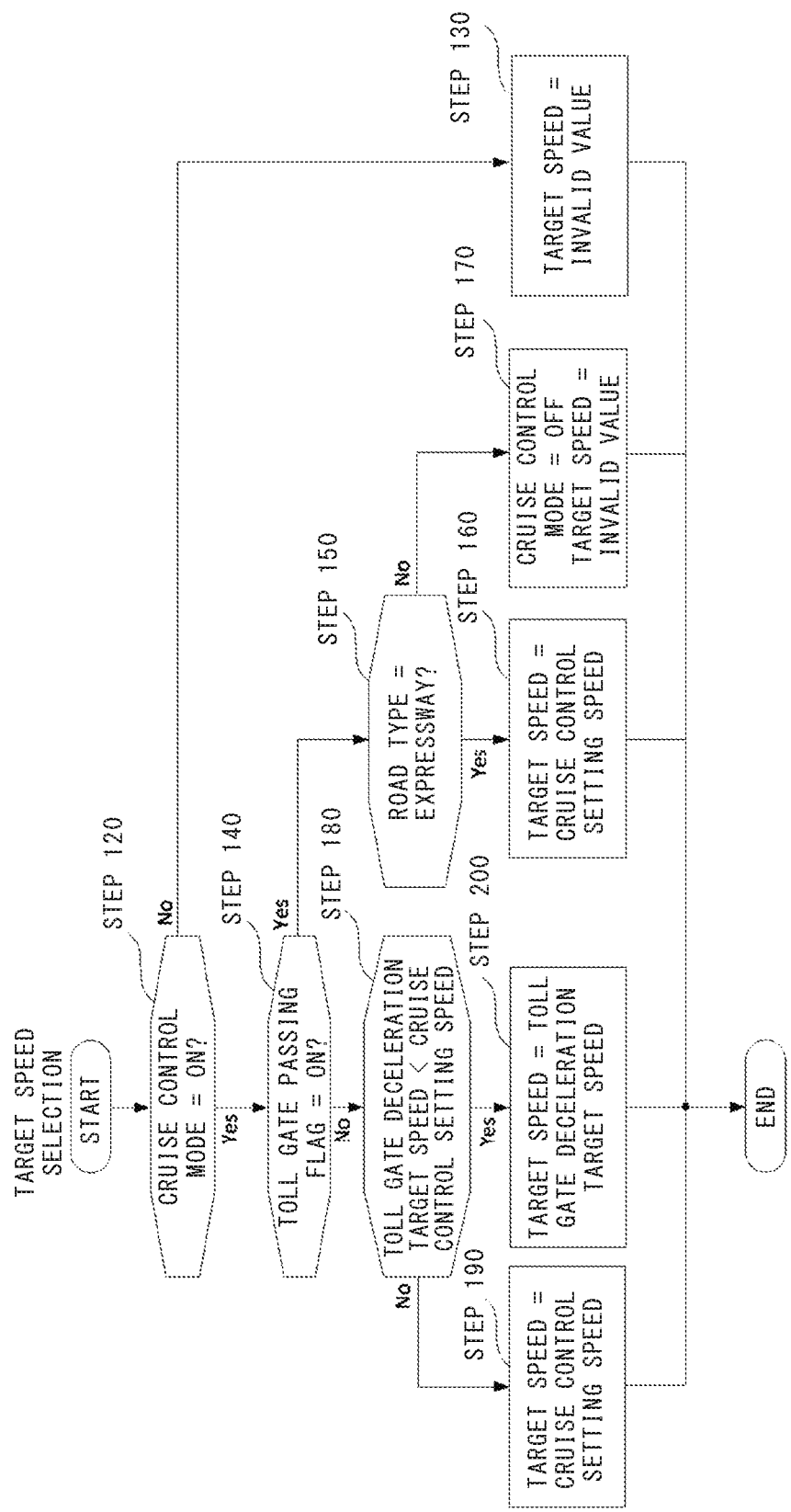
FIG. 3 is a flowchart showing operation of a target speed determining unit of the vehicle control device according to the first embodiment.

Next, operation of the vehicle control device 1A will be described. FIG. 2 is a flowchart showing operation of the vehicle control device 1A. FIG. 3 is a flowchart showing the details of operation in step 110 in FIG. 2. Operations in the flowcharts shown in FIG. 2 and FIG. 3 are repeatedly executed while an engine of the vehicle is ON.

The operation in FIG. 2 will be described. The driver of the vehicle inputs a cruise control start request using the cruise control start request input unit 10. In addition, the driver inputs a cruise control setting speed using the cruise control setting speed input unit 20 (step 10). In the case where only the cruise control start request is inputted, the speed of the vehicle at the time when the cruise control start request is inputted is automatically inputted to the cruise control setting speed input unit 20. Even if a cruise control start request is not inputted, the process proceeds to the next step.

Next, the vehicle position detection unit 30 detects the present position of the vehicle (step 20), and on the basis of the present position of the vehicle and the position of an ETC toll gate, the correlation unit 50 calculates the route distance from the present position of the vehicle to the ETC toll gate, and determines whether or not the vehicle has passed through the ETC toll gate (step 30). If the correlation unit 50 determines that the vehicle has passed through the ETC toll gate (step 40), the correlation unit 50 turns on the toll gate passing flag (step 50). If the correlation unit 50 determines that the vehicle has not passed through the ETC toll gate, the correlation unit 50 turns off the toll gate passing flag (step 60).

Next, the toll gate deceleration target speed calculation unit 60 calculates a toll gate deceleration target speed on the basis of the route distance from the present position of the vehicle to the ETC toll gate (step 70). Here, on the basis of the following Mathematical 1, a toll gate deceleration target speed V' is calculated. In Mathematical 1, along is a deceleration setting value set in advance, Vref is a toll gate permissible speed for passing through the ETC toll gate appropriately, and D is the route distance from the vehicle to the ETC toll gate. The deceleration setting value along and the toll gate permissible speed Vref are constants, and the route distance D from the vehicle to the toll gate is a variable.

$$\text{Toll gate deceleration target speed } V'[m/s] = \sqrt{2a_{long}D + V_{ref}^2} \quad \text{[Mathematical 1]}$$

Next, whether or not there is a cruise control start request is confirmed (step 80), and if there is a start request, the cruise control mode ON/OFF signal is turned on (step 90). If there is no start request, whether the cruise control mode ON/OFF signal was ON or OFF in the last-time execution of the flowchart is confirmed, and the cruise control mode ON/OFF signal is set to the same state as in the last-time execution of the flowchart (step 100). Then, target speed selection is performed (step 110). It is noted that the cruise control mode ON/OFF signal is reset to the initial value, i.e., OFF, when the engine is turned on, or by a driver's cancelation operation or an operation described below.

Next, target speed selection operation (step 110) will be described with reference to the flowchart shown in FIG. 3. Here, first, referring to the cruise control mode ON/OFF signal (step 120), if the cruise control mode ON/OFF signal is OFF, the target speed is set to an invalid value, and the vehicle is switched to a manual traveling state that is based on an acceleration/brake operation by the driver (step 130). If the cruise control mode ON/OFF signal is ON, next, the toll gate passing flag is referred to (step 140).

Then, if the toll gate passing flag is ON, the target speed determining unit 80A refers to the road type storage unit 70 and determines whether or not a road after passing through the ETC toll gate is an expressway (step 150). If the road after passing through the ETC toll gate is an expressway, the target speed is set to the cruise control setting speed that has been set in the cruise control setting speed input unit 20 before passing through the ETC toll gate (step 160). If the road after passing through the ETC toll gate is not an expressway, that is, the road is a general road, the cruise control mode ON/OFF signal is switched to OFF, the target speed is set to an invalid value, and the vehicle is switched to a manual traveling state that is based on an acceleration/brake operation by the driver (step 170).

If the toll gate passing flag is OFF, the vehicle has not passed through the ETC toll gate yet, and in order to set the target speed in preparation for passing through the ETC toll gate hereafter, the magnitude relationship between the toll gate deceleration target speed and the cruise control setting speed is confirmed (step 180). If the toll gate deceleration target speed is higher than the cruise control setting speed, the target speed is set to the cruise control setting speed (step 190). If the toll gate deceleration target speed is lower than the cruise control setting speed, the target speed is set to the toll gate deceleration target speed (step 200). After the target speed is determined, the process proceeds to step 210 in FIG. 2.

The speed control unit 90 refers to the cruise control mode ON/OFF signal (step 210). If the cruise control mode ON/OFF signal is ON, a vehicle speed control acceleration/deceleration value for causing the present speed of the vehicle to coincide with the target speed is outputted as a target acceleration/deceleration value to the throttle valve/brake 100 (step 220). It is noted that the vehicle speed control acceleration/deceleration value is calculated from the target speed and the present speed, using, for example, PI control which is a general feedback control method. On the other hand, if the cruise control mode ON/OFF signal is OFF, the target acceleration/deceleration value set at an invalid value is outputted (step 230).

As described above, the vehicle control device 1A according to the first embodiment performs the following operation. In the case where the cruise control mode ON/OFF signal is ON, constant-speed traveling at a cruise control setting speed and speed control in preparation for the ETC toll gate are performed. Then, when the toll gate passing flag is turned on, on the basis of the road type of a road after passing through the ETC toll gate, if the road after passing through the ETC toll gate is an expressway, the target speed is set to the cruise control setting speed so that, also after passing through the ETC toll gate, constant-speed traveling control is performed by the cruise control unit at the same speed as that before passing through the ETC toll gate. On the other hand, if the road after passing through the ETC toll gate is a general road, the target speed is set to an invalid value and the vehicle is switched to a manual traveling state that is based on an acceleration/brake operation by the driver. Thus, it is possible to perform the vehicle control in accordance with the type of the road after passing through the ETC toll gate. Therefore, in the case where the road after passing through the ETC toll gate is an expressway, constant-speed traveling at the cruise control setting speed is performed, so that the driver need not accelerate the vehicle by the driver's operation, and in the case where the road after passing through the ETC toll gate is a general road, switching to driver's manual traveling is performed, so that the vehicle will not be accelerated unnecessarily and the driver need not decelerate the vehicle by the driver's operation. Thus, load on the driver can be reduced.

Second Embodiment

Figure 4:
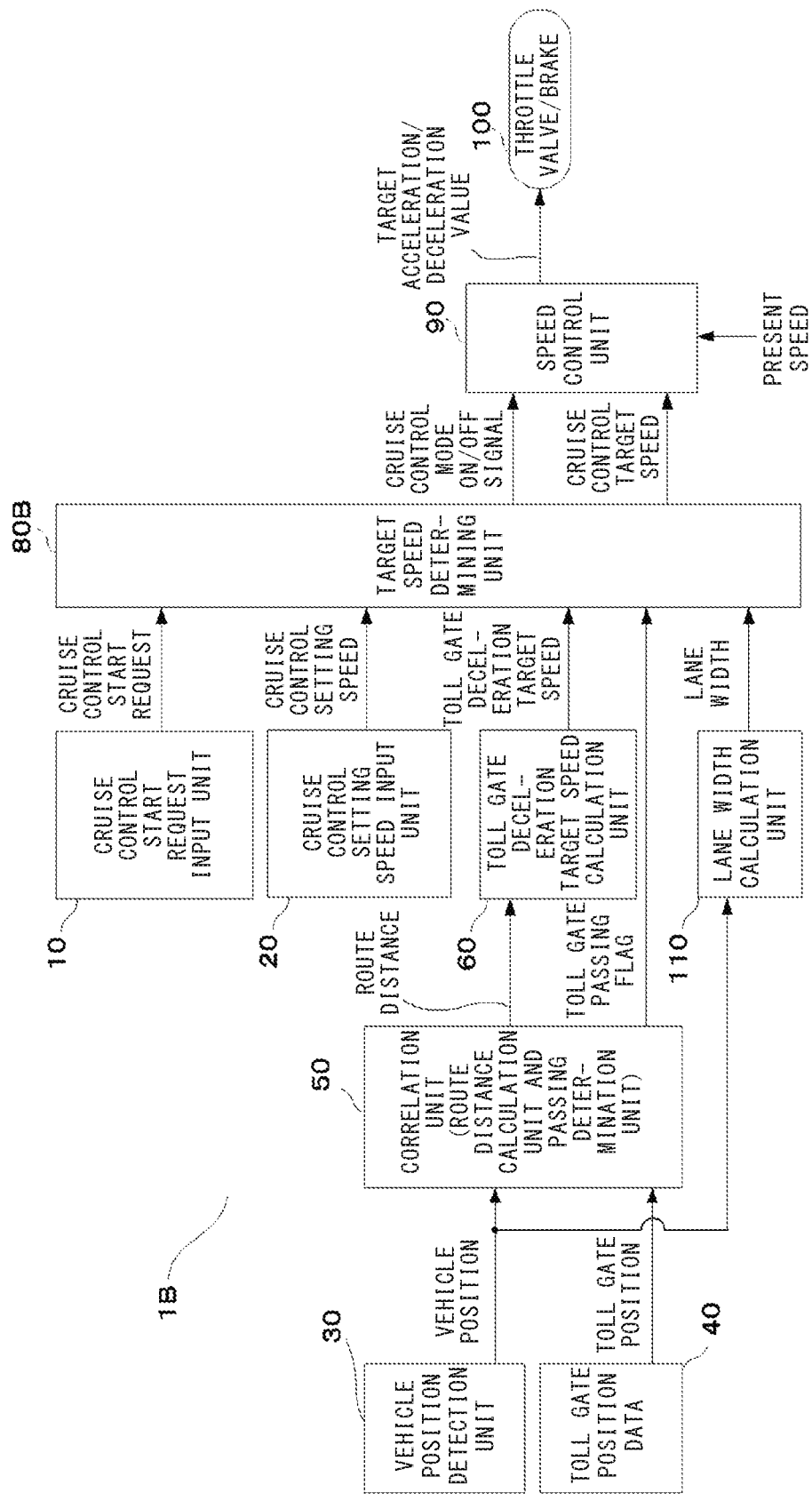
FIG. 4 is a block diagram showing the configuration of a vehicle control device according to the second embodiment of the present disclosure.

A vehicle control device 1B according to the second embodiment will be described. FIG. 4 is a block diagram showing the configuration of the vehicle control device 1B. In FIG. 4, the components other than a target speed determining unit 80B and a lane width calculation unit 110 are the same as those in the first embodiment and therefore the description thereof is omitted. The lane width calculation unit 110 corresponds to the vehicle frontward detecting unit in the claims, and detects and outputs the lane width of a road frontward of the vehicle. Examples of means for detecting the lane width of a road frontward of the vehicle include a car navigation system storing lane widths of roads, and a front camera. The target speed determining unit 80B determines the cruise control mode ON/OFF signal and a final cruise control target speed on the basis of a cruise control start request, a cruise control setting speed, a toll gate deceleration target speed, the toll gate passing flag, and the lane width of a road after passing through an ETC toll gate. The cruise control start request unit 10, the cruise control setting speed input unit 20, a part of the target speed determining unit 80B, and the speed control unit 90 correspond to the cruise control unit in the claims, and the cruise control mode ON/OFF signal and the final cruise control target speed correspond to the control content in the cruise control unit in the claims. In addition, the toll gate deceleration target speed calculation unit 60, the target speed determining unit 80B, and the speed control unit 90 correspond to the first control unit in the claims, and the target speed determining unit 80B and the speed control unit 90 correspond to the second control unit in the claims. It is noted that, in the case where the cruise control mode ON/OFF signal is OFF, the vehicle is set to a manual traveling state that is based on an acceleration/brake operation by the driver.

Figure 5:
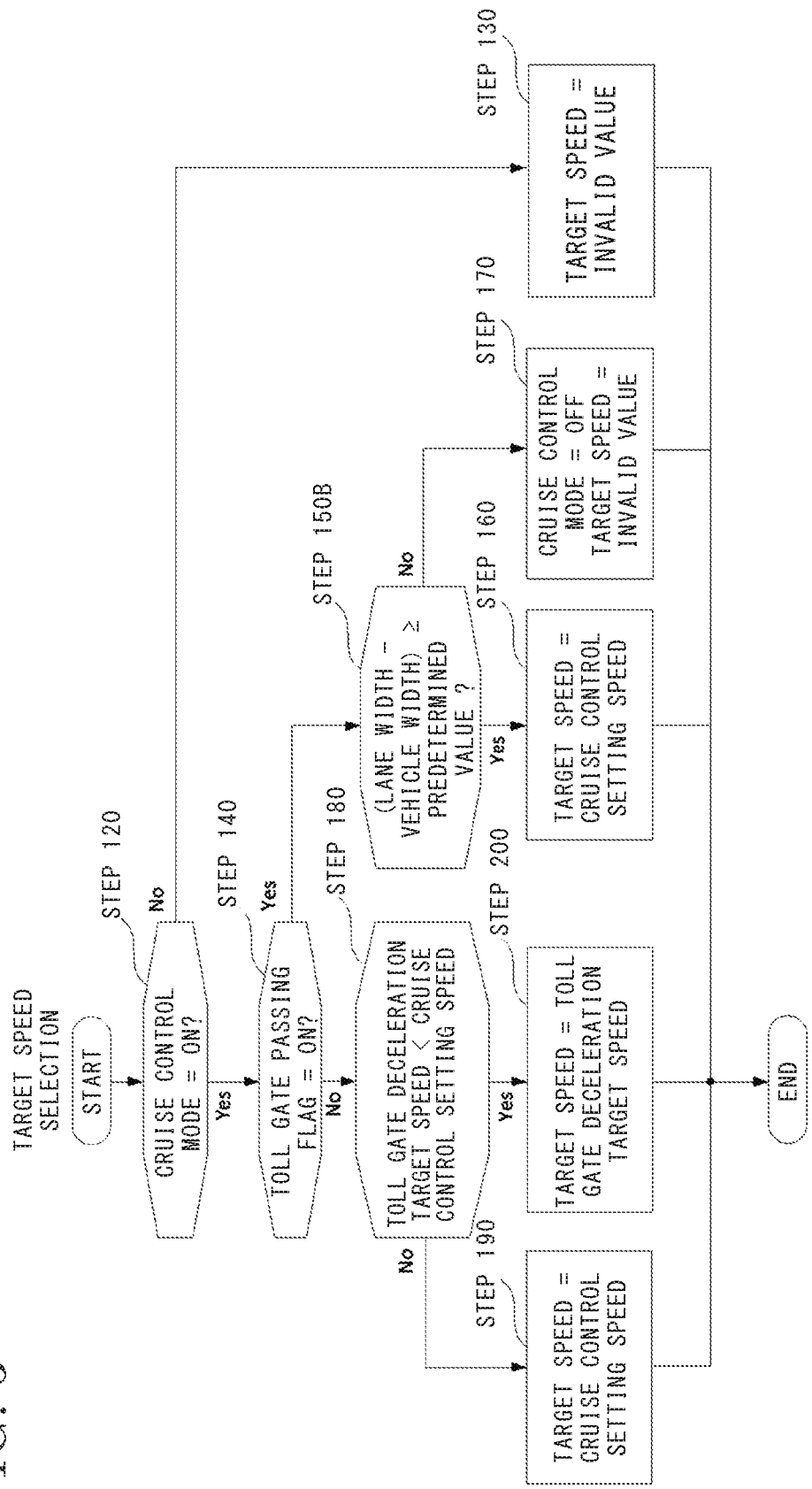
FIG. 5 is a flowchart showing operation of a target speed determining unit of the vehicle control device according to the second embodiment.

Next, operation of the vehicle control device 1B will be described. Operations other than step 110 in FIG. 2 are the same as those in the first embodiment, and the description thereof is omitted. FIG. 5 shows the details of operation in step 110 in the second embodiment.

In the flowchart shown in FIG. 5, operations other than step 150B are performed in the same manner as in the first embodiment. In the vehicle control device 1B, the target speed determining unit 80B refers to the lane width calculation unit 110, and determines whether or not a difference between the lane width of a road after passing through an ETC toll gate and the width of the vehicle is equal to or greater than a predetermined value (step 150B). The width of the vehicle is stored in advance in the target speed determining unit 80B. If the difference is equal to or greater than the predetermined value, the lane width of the road after passing through the ETC toll gate is determined to be wide, and the target speed is set to the cruise control setting speed that has been set in the cruise control setting speed input unit 20 before passing through the ETC toll gate (step 160). If the difference is smaller than the predetermined value, the lane width of the road after passing through the ETC toll gate is determined to be narrow, the cruise control mode ON/OFF signal is switched to OFF, the target speed is set to an invalid value, and the vehicle is switched to a manual traveling state that is based on an acceleration/brake operation by the driver (step 170).

For example, in the case where the difference is 1.6 m or greater, the target speed is set to the cruise control setting speed so that, also after passing through the ETC toll gate, constant-speed traveling control is performed by the cruise control unit at the same speed as that before passing through the ETC toll gate. In the case where the difference is smaller than 1.6 m, the target speed is set to an invalid value and the vehicle is switched to a manual traveling state that is based on an acceleration/brake operation by the driver.

As described above, the vehicle control device 1B according to the second embodiment performs the following operation. In the case where the cruise control mode ON/OFF signal is ON, constant-speed traveling at a cruise control setting speed and speed control in preparation for an ETC toll gate are performed. Then, when the toll gate passing flag is turned on, if the above difference is equal to or greater than the predetermined value, the target speed is set to the cruise control setting speed so that, also after passing through the ETC toll gate, constant-speed traveling control is performed by the cruise control unit at the same speed as that before passing through the ETC toll gate. On the other hand, if the above difference is smaller than the predetermined value, the target speed is set to an invalid value and the vehicle is switched to a manual traveling state that is based on an acceleration/brake operation by the driver. Thus, it is possible to perform the vehicle control in accordance with the lane width of a road after passing through the ETC toll gate. Therefore, in the case where the above difference is equal to or greater than the predetermined value, constant-speed traveling at the cruise control setting speed is performed, so that the driver need not accelerate the vehicle by the driver's operation, and in the case where the above difference is smaller than the predetermined value, switching to driver's manual traveling is performed, so that the vehicle will not be accelerated unnecessarily and the driver need not decelerate the vehicle by the driver's operation. Thus, load on the driver can be reduced.

In step 150B for determining whether the lane width of a road after passing through an ETC toll gate is wide or narrow, the determination is performed on the basis of a difference between the lane width and the width of the vehicle. However, the determination may be performed in a simpler manner, i.e., on the basis of whether or not the lane width is equal to or greater than a predetermined value. Also in this case, when the lane width is equal to or greater than the predetermined value, constant-speed traveling at the cruise control setting speed is performed, so that the driver need not accelerate the vehicle by the driver's operation, and when the lane width is smaller than the predetermined value, switching to driver's manual traveling is performed, so that the vehicle will not be accelerated unnecessarily and the driver need not decelerate the vehicle by the driver's operation. Thus, load on the driver can be reduced.

Third Embodiment

Figure 6:
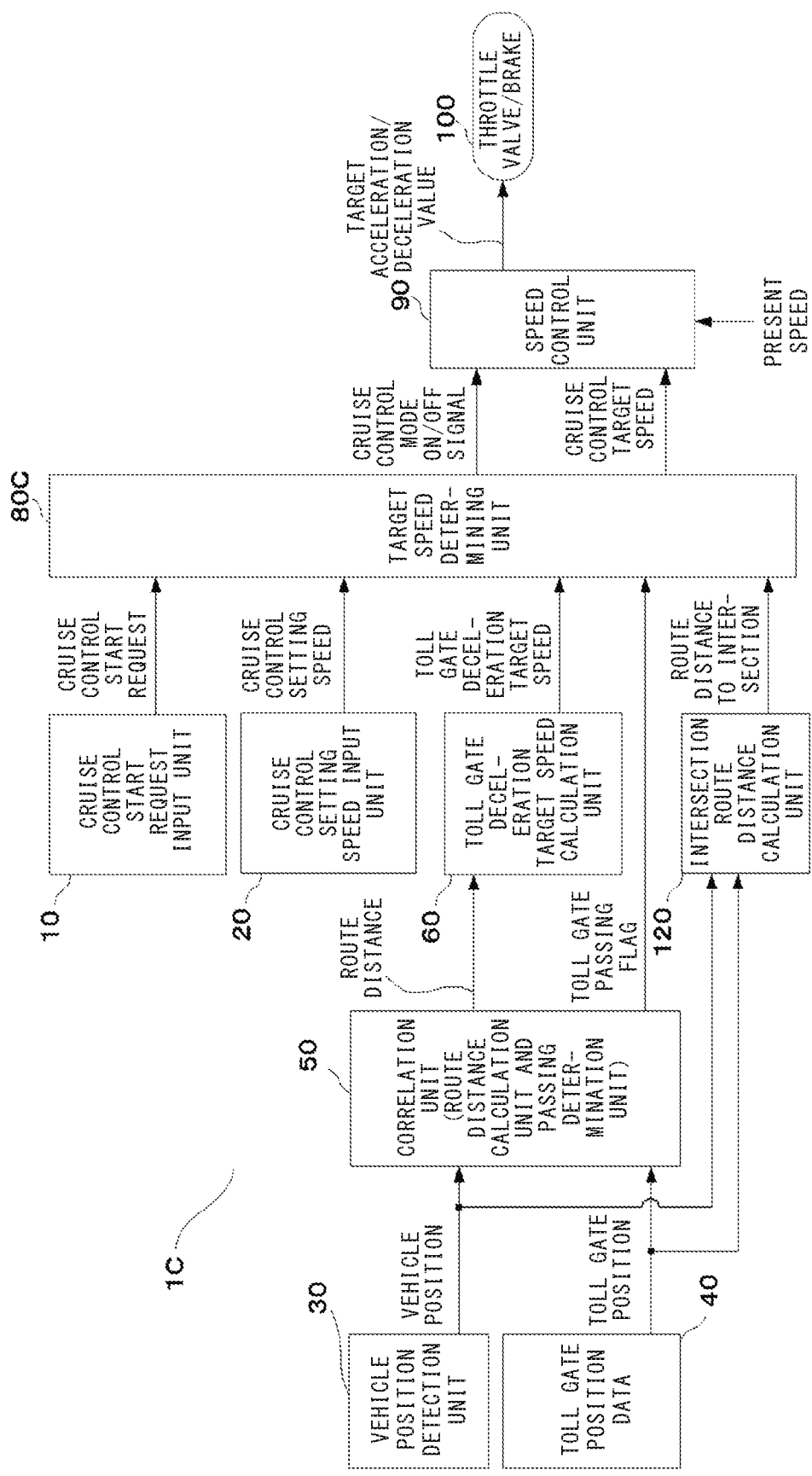
FIG. 6 is a block diagram showing the configuration of a vehicle control device according to the third embodiment of the present disclosure.

A vehicle control device 1C according to the third embodiment will be described. FIG. 6 is a block diagram showing the configuration of the vehicle control device 1C. In FIG. 6, the components other than a target speed determining unit 80C and an intersection route distance calculation unit 120 are the same as those in the first and second embodiments and therefore the description thereof is omitted. The intersection route distance calculation unit 120 corresponds to the vehicle frontward detecting unit in the claims. The intersection route distance calculation unit 120 stores the positions (latitudes and longitudes) of intersections in advance, and calculates and outputs the route distance from an ETC toll gate to the next intersection on a road after passing through the ETC toll gate. Examples of means for calculating and outputting the route distance to the intersection include a car navigation system storing the toll gate position data 40 and the positions (latitudes and longitudes) of intersections. The target speed determining unit 80C determines the cruise control mode ON/OFF signal and a final cruise control target speed on the basis of a cruise control start request, a cruise control setting speed, a toll gate deceleration target speed, the toll gate passing flag, and the route distance to the intersection. The cruise control start request unit 10, the cruise control setting speed input unit 20, a part of the target speed determining unit 80C, and the speed control unit 90 correspond to the cruise control unit in the claims, and the cruise control mode ON/OFF signal and the final cruise control target speed correspond to the control content in the cruise control unit in the claims. In addition, the toll gate deceleration target speed calculation unit 60, the target speed determining unit 80C, and the speed control unit 90 correspond to the first control unit in the claims, and the target speed determining unit 80C and the speed control unit 90 correspond to the second control unit in the claims. It is noted that, in the case where the cruise control mode ON/OFF signal is OFF, the vehicle is set to a manual traveling state that is based on an acceleration/brake operation by the driver.

Figure 7:
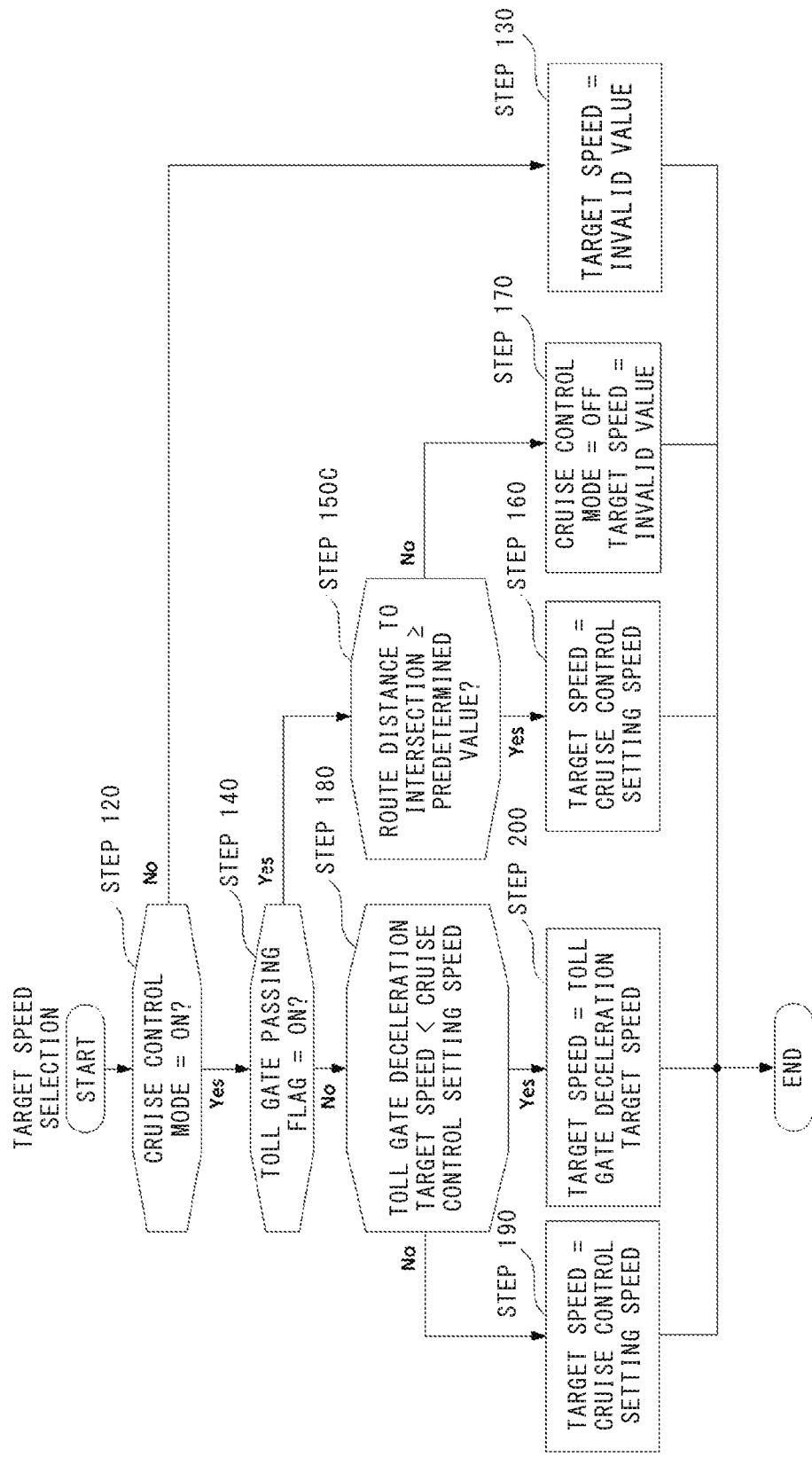
FIG. 7 is a flowchart showing operation of a target speed determining unit of the vehicle control device according to the third embodiment.

Next, operation of the vehicle control device 1C will be described. Operations other than step 110 in FIG. 2 are the same as those in the first and second embodiments and therefore the description thereof is omitted. FIG. 7 shows the details of operation in step 110 in the third embodiment.

In the flowchart shown in FIG. 7, operations other than step 150C are performed in the same manner as in the first and second embodiments. In the vehicle control device 1C, the target speed determining unit 80C refers to the intersection route distance calculation unit 120, and determines whether or not the route distance to the intersection is equal to or greater than a predetermined value (step 150C). If the route distance to the intersection is equal to or greater than the predetermined value, the target speed is set to the cruise control setting speed that has been set in the cruise control setting speed input unit 20 before passing through the ETC toll gate (step 160). If the route distance to the intersection is smaller than the predetermined value, the cruise control mode ON/OFF signal is switched to OFF, the target speed is set to an invalid value, and the vehicle is switched to a manual traveling state that is based on an acceleration/brake operation by the driver (step 170).

For example, in the case where the route distance to the intersection is 500 m or greater, the target speed is set to the cruise control setting speed so that, also after passing through the ETC toll gate, constant-speed traveling control is performed by the cruise control unit at the same speed as that before passing through the ETC toll gate. In the case where the route distance to the intersection is smaller than 500 m, the target speed is set to an invalid value and the vehicle is switched to a manual traveling state that is based on an acceleration/brake operation by the driver.

As described above, the vehicle control device 1C according to the third embodiment performs the following operation. In the case where the cruise control mode ON/OFF signal is ON, constant-speed traveling at a cruise control setting speed and speed control in preparation for the ETC toll gate are performed. Then, when the toll gate passing flag is turned on, if the route distance to the intersection is equal to or greater than the predetermined value, the target speed is set to the cruise control setting speed so that, also after passing through the ETC toll gate, constant-speed traveling control is performed by the cruise control unit at the same speed as that before passing through the ETC toll gate. On the other hand, if the route distance to the intersection is smaller than the predetermined value, the target speed is set to an invalid value and the vehicle is switched to a manual traveling state that is based on an acceleration/brake operation by the driver. Thus, it is possible to perform the vehicle control in accordance with the route distance to the intersection. Therefore, in the case where the route distance to the intersection is equal to or greater than the predetermined value, constant-speed traveling at the cruise control setting speed is performed, so that the driver need not accelerate the vehicle by the driver's operation, and in the case where the route distance to the intersection is smaller than the predetermined value, switching to driver's manual traveling is performed, so that the vehicle will not be accelerated unnecessarily and the driver need not decelerate the vehicle by the driver's operation. Thus, load on the driver can be reduced.

In the operations of the vehicle control devices 1A to 1C according to the first to third embodiments, in step 150 (or step 150B or 150C), information about a road after passing through an ETC toll gate is detected, and in accordance with a result of the detection, control is performed in either of the following ways: the target speed is set to the cruise control setting speed so that, also after passing through the ETC toll gate, constant-speed traveling control is performed by the cruise control unit at the same speed as that before passing through the ETC toll gate; or the target speed is set to an invalid value and the vehicle is switched to a manual traveling state that is based on an acceleration/brake operation by the driver.

Figure 8:
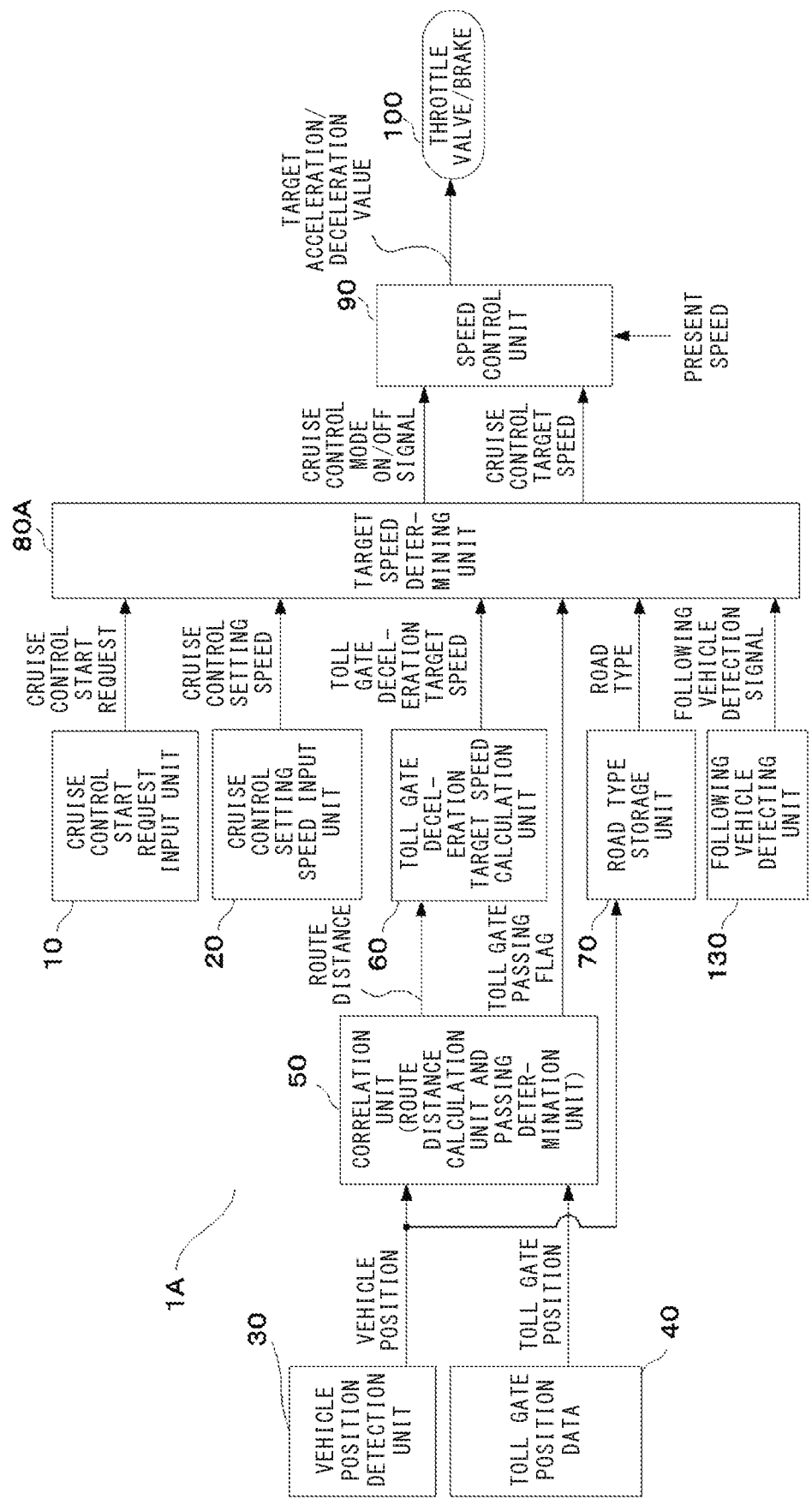
FIG. 8 is a block diagram showing the configuration of a vehicle control device according to a modification of the first embodiment.

Here, a modification of the control in which the target speed is set to an invalid value and the vehicle is switched to a manual traveling state that is based on an acceleration/brake operation by the driver, will be described. FIG. 8 is a block diagram showing a modification of the vehicle control device 1A. The components other than a following vehicle detecting unit 130 are the same as those in the vehicle control device 1A and therefore the description thereof is omitted. The following vehicle detecting unit 130 determines whether or not there is a following vehicle after the vehicle. If there is a following vehicle, the following vehicle detecting unit 130 outputs a following vehicle detection signal accordingly, to the target speed determining unit 80A. For example, the vehicle is provided with a millimeter-wave radar, a sonar sensor (ultrasonic sensor), a camera, or the like, to determine whether or not there is a following vehicle after the vehicle.

Figure 9:
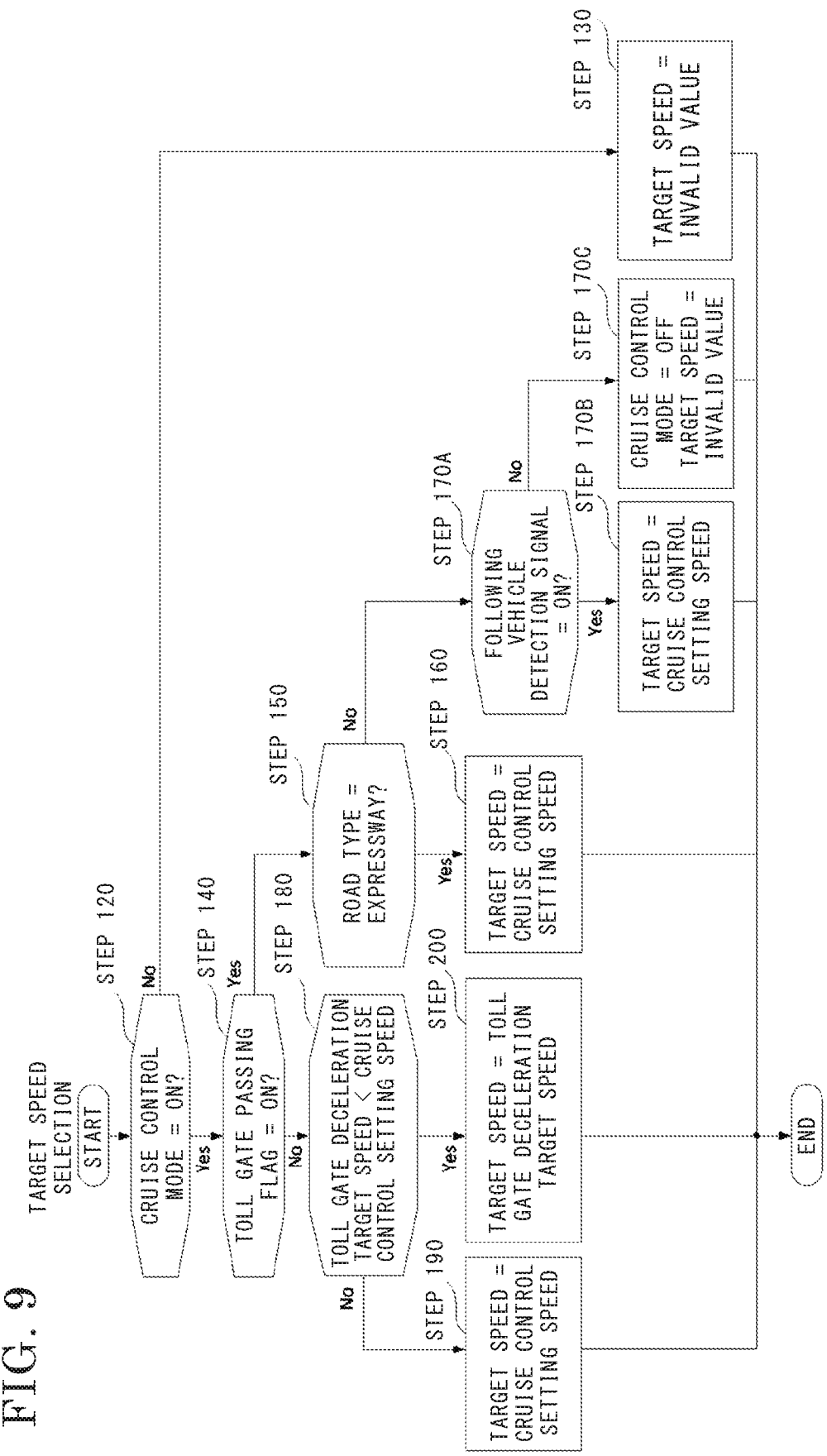
FIG. 9 is a flowchart showing operation of a target speed determining unit of the vehicle control device according to the modification of the first embodiment.

Next, operation in the modification will be described. Operations other than step 110 in FIG. 2 are the same as those in the first embodiment and therefore the description thereof is omitted. FIG. 9 shows the details of operation in step 110 in the modification. Operations other than steps 170A to 170C are performed in the same manner as in the target speed determining unit 80A and therefore the description thereof is omitted. In step 150, if the road type is a general road, whether or not the following vehicle detection signal is ON is determined (step 170A). If the following vehicle detection signal is ON, i.e., if there is a following vehicle, the target speed is set to the cruise control setting speed that has been set in the cruise control setting speed input unit 20 before passing through the ETC toll gate (step 170B). If the following vehicle detection signal is OFF, i.e., if there is no following vehicle, the cruise control mode ON/OFF signal is switched to off, the target speed is set to an invalid value, and the vehicle is switched to a manual traveling state that is based on an acceleration/brake operation by the driver (step 170C).

As described above, when, on the basis of a result of detection by the vehicle frontward detecting unit, changing the control content in the cruise control unit to an invalid value and switching to a manual traveling state that is based on an acceleration/brake operation by the driver, the following vehicle detecting unit 130 is referred to and if there is a following vehicle, the control content in the cruise control unit is changed to constant-speed traveling at the speed that has been set by the driver before passing through the ETC toll gate. If there is no following vehicle, the vehicle is switched to a manual traveling state that is based on an acceleration/brake operation by the driver. Thus, the same effects as in the first embodiment can be provided, and it is possible to reduce the possibility that the vehicle is rear-ended by a following vehicle after passing through the ETC toll gate.

It is noted that, in step 170B in FIG. 9, the speed of a following vehicle may be detected using the following vehicle detecting unit 130, and the target speed may be set to the same speed as that of the following vehicle. Thus, even if the cruise control setting speed is higher than the speed of the following vehicle, the vehicle is prevented from being accelerated to an unnecessarily high speed, while the possibility that the vehicle is rear-ended by the following vehicle is reduced.

In the above modification, the case where the vehicle control device 1A described in the first embodiment is modified has been described. However, the vehicle control device 1B described in the second embodiment or the vehicle control device 1C described in the third embodiment may be modified in the same manner, whereby the same effects can be provided.

Fourth Embodiment

Figure 10:
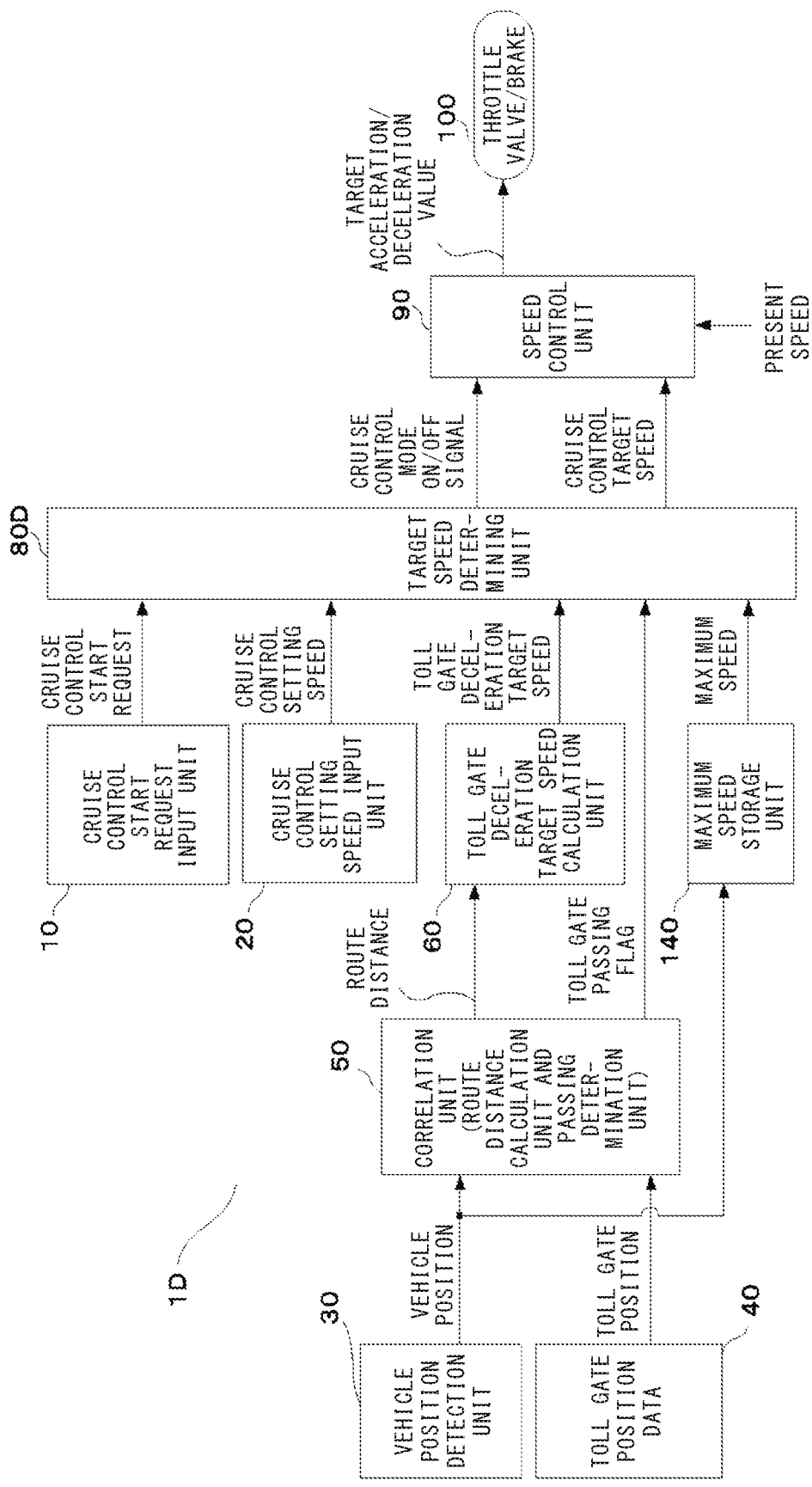
FIG. 10 is a block diagram showing the configuration of a vehicle control device according to the fourth embodiment of the present disclosure.

A vehicle control device 1D according to the fourth embodiment will be described. FIG. 10 is a block diagram showing the configuration of the vehicle control device 1D. In FIG. 10, the components other than a target speed determining unit 80D and a maximum speed storage unit 140 are the same as those in the first to third embodiments, and therefore the description thereof is omitted. The maximum speed storage unit 140 corresponds to the vehicle frontward detecting unit in the claims. The maximum speed storage unit 140 stores maximum speeds on roads, and on the basis of the present position of the vehicle, outputs the maximum speed at the present position of the vehicle. Examples of means for storing the maximum speeds on roads and outputting the maximum speed at the present position of the vehicle include a car navigation system. The target speed determining unit 80D determines the cruise control mode ON/OFF signal and a final cruise control target speed on the basis of a cruise control start request, a cruise control setting speed, a toll gate deceleration target speed, the toll gate passing flag, and the maximum speed at the present position of the vehicle. The cruise control start request unit 10, the cruise control setting speed input unit 20, a part of the target speed determining unit 80D, and the speed control unit 90 correspond to the cruise control unit in the claims, and the cruise control mode ON/OFF signal and the final cruise control target speed correspond to the control content in the cruise control unit in the claims. In addition, the toll gate deceleration target speed calculation unit 60, the target speed determining unit 80D, and the speed control unit 90 correspond to the first control unit in the claims, and the target speed determining unit 80D and the speed control unit 90 correspond to the second control unit in the claims. It is noted that, in the case where the cruise control mode ON/OFF signal is OFF, the vehicle is set to a manual traveling state that is based on an acceleration/brake operation by the driver.

Figure 11:
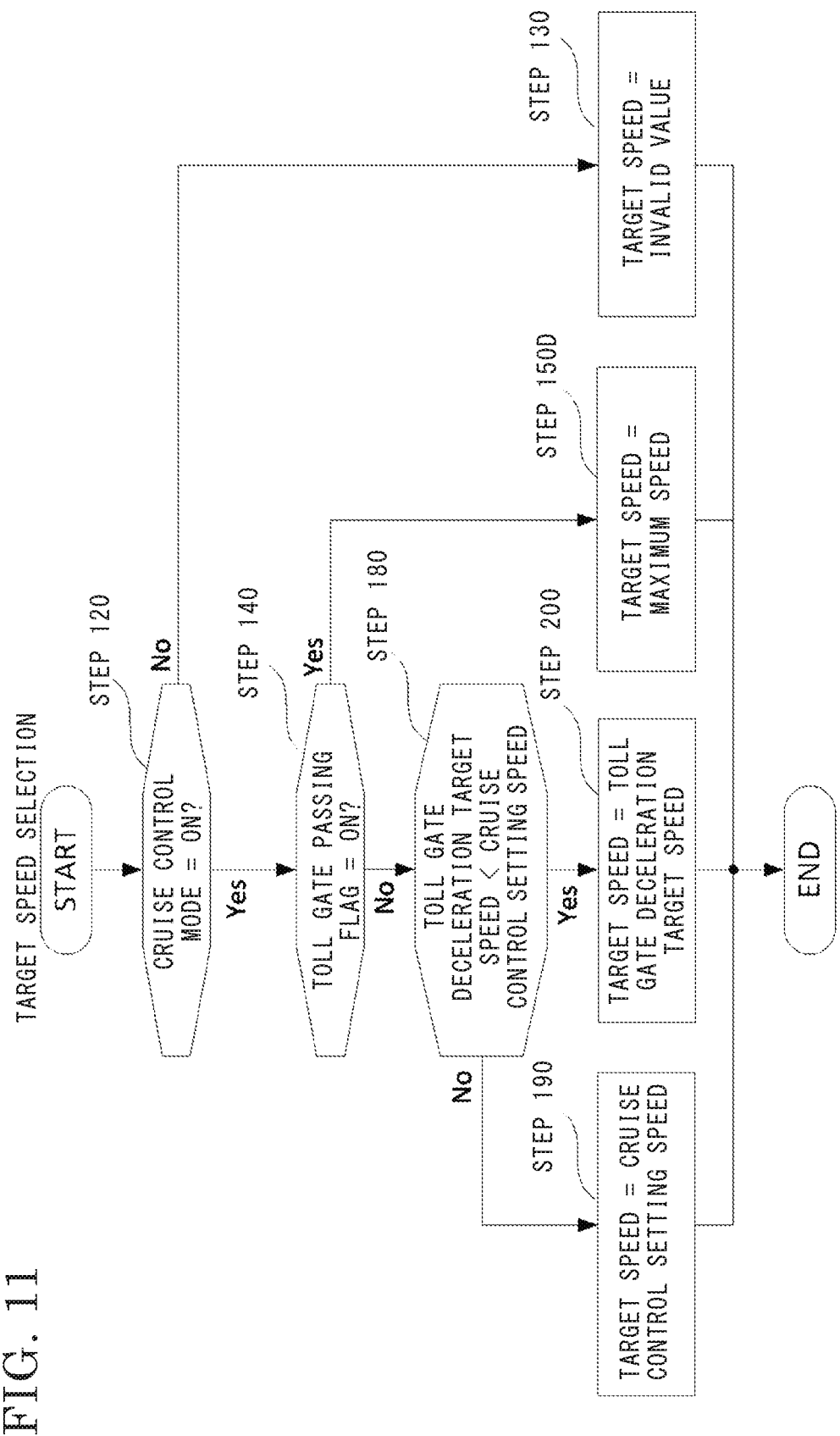
FIG. 11 is a flowchart showing operation of a target speed determining unit of the vehicle control device according to the fourth embodiment.

Next, operation of the vehicle control device 1D will be described. Operations of the vehicle control device 1D other than step 110 in FIG. 2 are the same as in the first to third embodiments, and therefore the description thereof is omitted. FIG. 11 shows the details of operation in step 110 in the fourth embodiment.

The vehicle control device 1D does not perform processes corresponding to steps 160 and 170 described in the first to third embodiments. In the flowchart shown in FIG. 11, operations other than step 150D are the same as those in the first to third embodiments and therefore the description thereof is omitted. In the vehicle control device 1D, the toll gate passing flag is referred to (step 140), and if the toll gate passing flag is ON, the maximum speed storage unit 140 is referred to, and the maximum speed at the present position of the vehicle, i.e., the maximum speed on a road after passing through the ETC toll gate, is set as the target speed (step 150D).

As described above, the vehicle control device 1D according to the fourth embodiment performs the following operation. In the case where the cruise control mode ON/OFF signal is ON, constant-speed traveling at a cruise control setting speed and speed control in preparation for the ETC toll gate are performed. Then, when the toll gate passing flag is turned on, the target speed is set to the maximum speed on a road after passing through the ETC toll gate, so that, also after passing through the ETC toll gate, constant-speed traveling control is performed by the cruise control unit. Thus, it is possible to perform the vehicle control in accordance with the maximum speed on the road after passing through the ETC toll gate. Therefore, the driver need not control acceleration/deceleration of the vehicle by the driver's operation, and load on the driver can be reduced.

Fifth Embodiment

Figure 12:
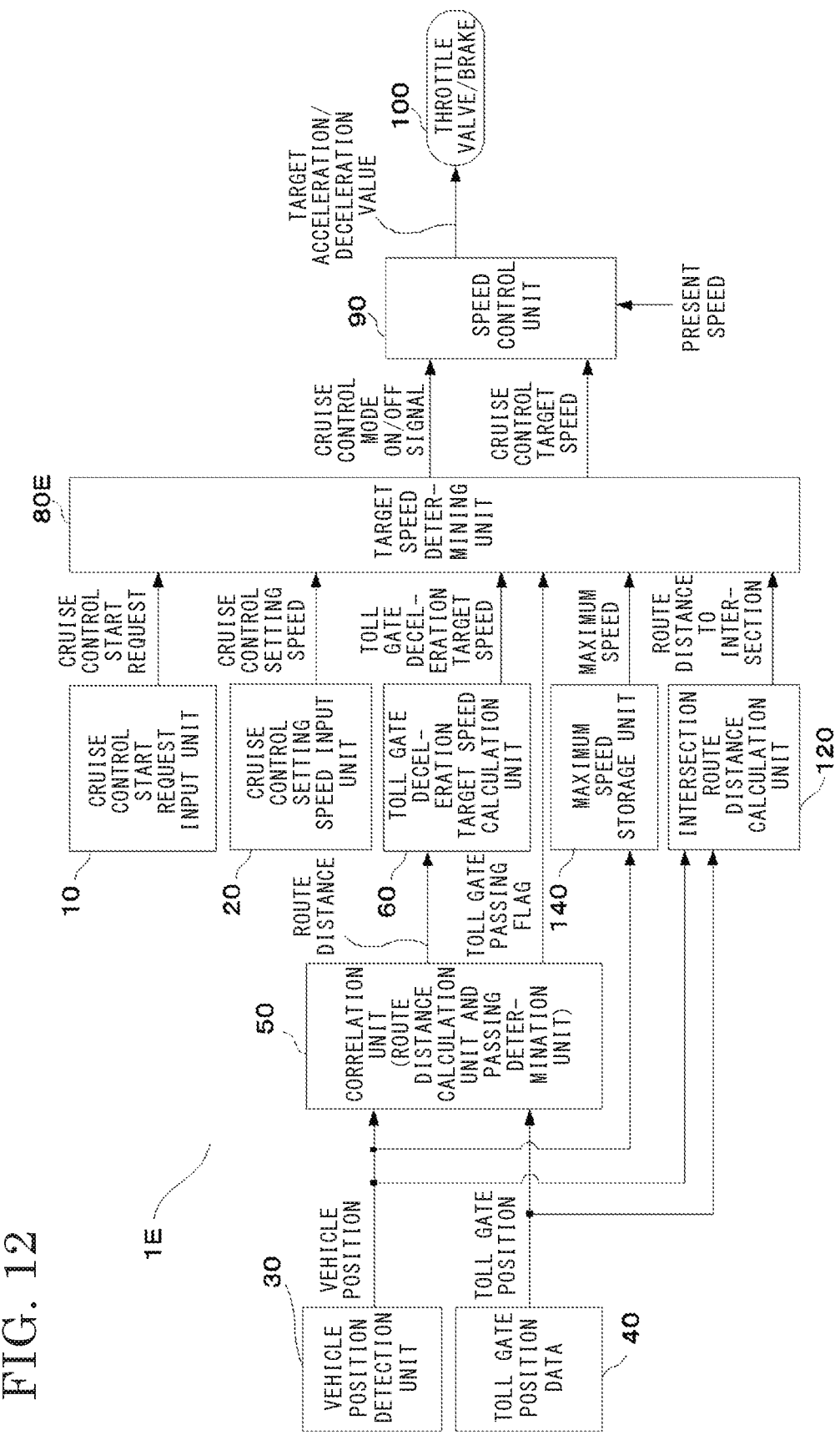
FIG. 12 is a block diagram showing the configuration of a vehicle control device according to the fifth embodiment of the present disclosure.

A vehicle control device 1E according to the fifth embodiment will be described. FIG. 12 is a block diagram showing the configuration of the vehicle control device 1E. In FIG. 12, the components other than a target speed determining unit 80E, the intersection route distance calculation unit 120, and the maximum speed storage unit 140 are the same as those in the first to fourth embodiments, and therefore the description thereof is omitted. The intersection route distance calculation unit 120 and the maximum speed storage unit 140 correspond to the vehicle frontward detecting unit in the claims, the intersection route distance calculation unit 120 is the same as that in the third embodiment, and the maximum speed storage unit 140 is the same as that in the fourth embodiment. Therefore, the description thereof is omitted.

The target speed determining unit 80E determines the cruise control mode ON/OFF signal and a final cruise control target speed on the basis of a cruise control start request, a cruise control setting speed, a toll gate deceleration target speed, the toll gate passing flag, the maximum speed at the present position of the vehicle, and the route distance from an ETC toll gate to the next intersection on a road after passing through the ETC toll gate. The cruise control start request unit 10, the cruise control setting speed input unit 20, a part of the target speed determining unit 80E, and the speed control unit 90 correspond to the cruise control unit in the claims, and the cruise control mode ON/OFF signal and the final cruise control target speed correspond to the control content in the cruise control unit in the claims. In addition, the toll gate deceleration target speed calculation unit 60, the target speed determining unit 80E, and the speed control unit 90 correspond to the first control unit in the claims, and the target speed determining unit 80E and the speed control unit 90 correspond to the second control unit in the claims. It is noted that, in the case where the cruise control mode ON/OFF signal is OFF, the vehicle is set to a manual traveling state that is based on an acceleration/brake operation by the driver.

Figure 13:
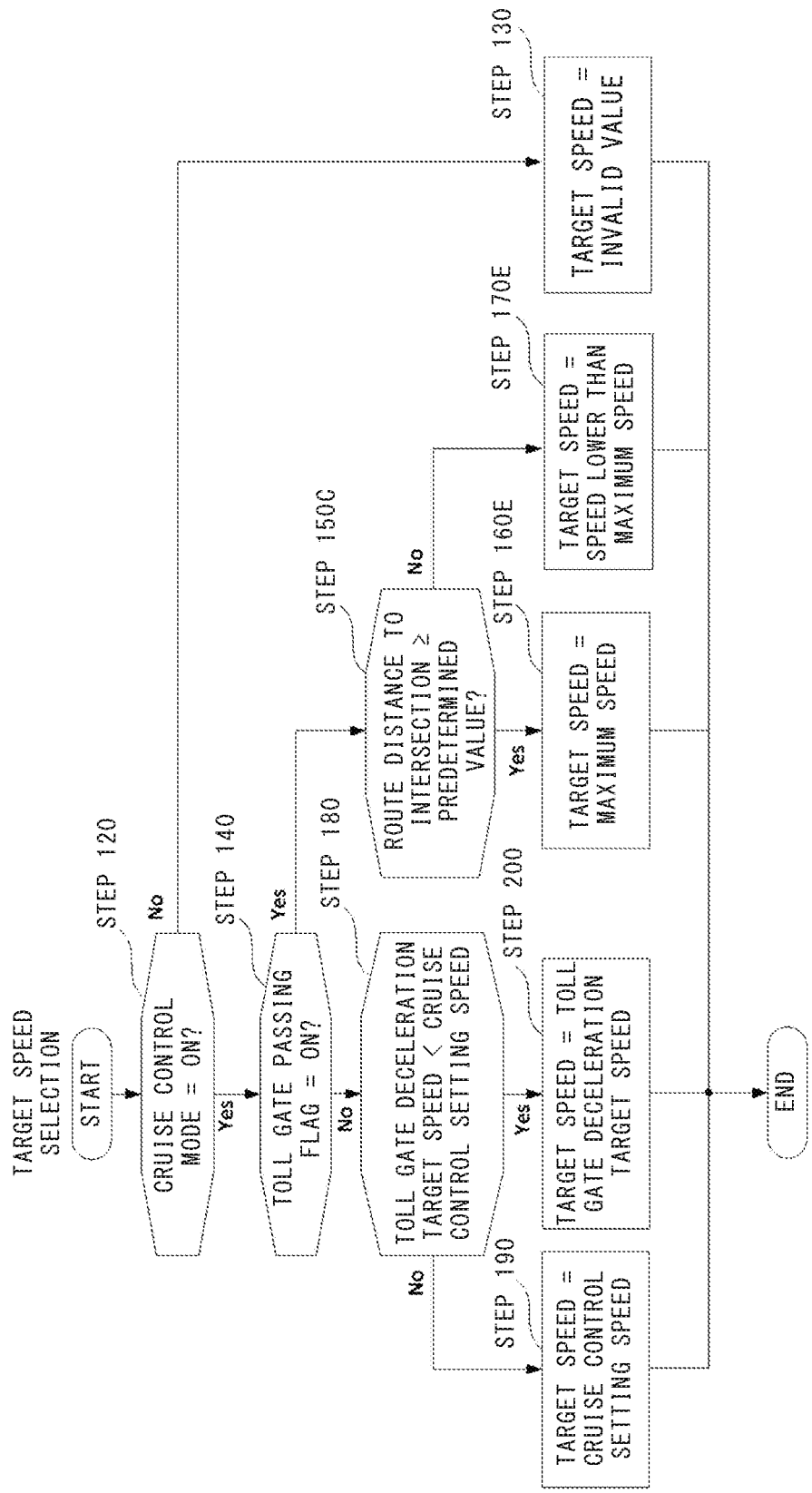
FIG. 13 is a flowchart showing operation of a target speed determining unit of the vehicle control device according to the fifth embodiment.

Next, operation of the vehicle control device 1E will be described. Operations of the vehicle control device 1E other than step 110 in FIG. 2 are the same as those in the first to fourth embodiments, and therefore the description thereof is omitted. FIG. 13 shows the details of operation in step 110 in the fifth embodiment.

In the flowchart shown in FIG. 13, operations other than step 160E and step 170E are the same as those in the third embodiment, and therefore the description thereof is omitted. In the vehicle control device 1E, the target speed determining unit 80E refers to the intersection route distance calculation unit 120 (step 150C), and if the route distance to the intersection is equal to or greater than the predetermined value, the target speed determining unit 80E sets the target speed to the maximum speed on a road after passing through the ETC toll gate (step 160E). If the route distance to the intersection is smaller than the predetermined value, the target speed determining unit 80E sets the target speed to be lower than the maximum speed on a road after passing through the ETC toll gate (step 170E).

For example, in the case where the route distance to the intersection is equal to or greater than 500 m, the target speed is set to the maximum speed on a road after passing through the ETC toll gate. In the case where the route distance to the intersection is smaller than 500 m, the target speed is set to be lower, by 10 km/h, than the maximum speed on a road after passing through the ETC toll gate.

As described above, the vehicle control device 1E according to the fifth embodiment performs the following operation. In the case where the cruise control mode ON/OFF signal is ON, constant-speed traveling at a cruise control setting speed and speed control in preparation for the ETC toll gate are performed. Then, when the toll gate passing flag is turned on, if the route distance to the intersection is equal to or greater than the predetermined value, the target speed is set to the maximum speed on a road after passing through the ETC toll gate, and if the route distance to the intersection is smaller than the predetermined value, the target speed is set to be lower than the maximum speed on a road after passing through the ETC toll gate, whereby constant-speed traveling control is performed by the cruise control unit. Thus, it is possible to perform the vehicle control in accordance with the route distance to the intersection. Therefore, the driver need not control acceleration/deceleration of the vehicle by the driver's operation, and load on the driver can be reduced.

Figure 14:
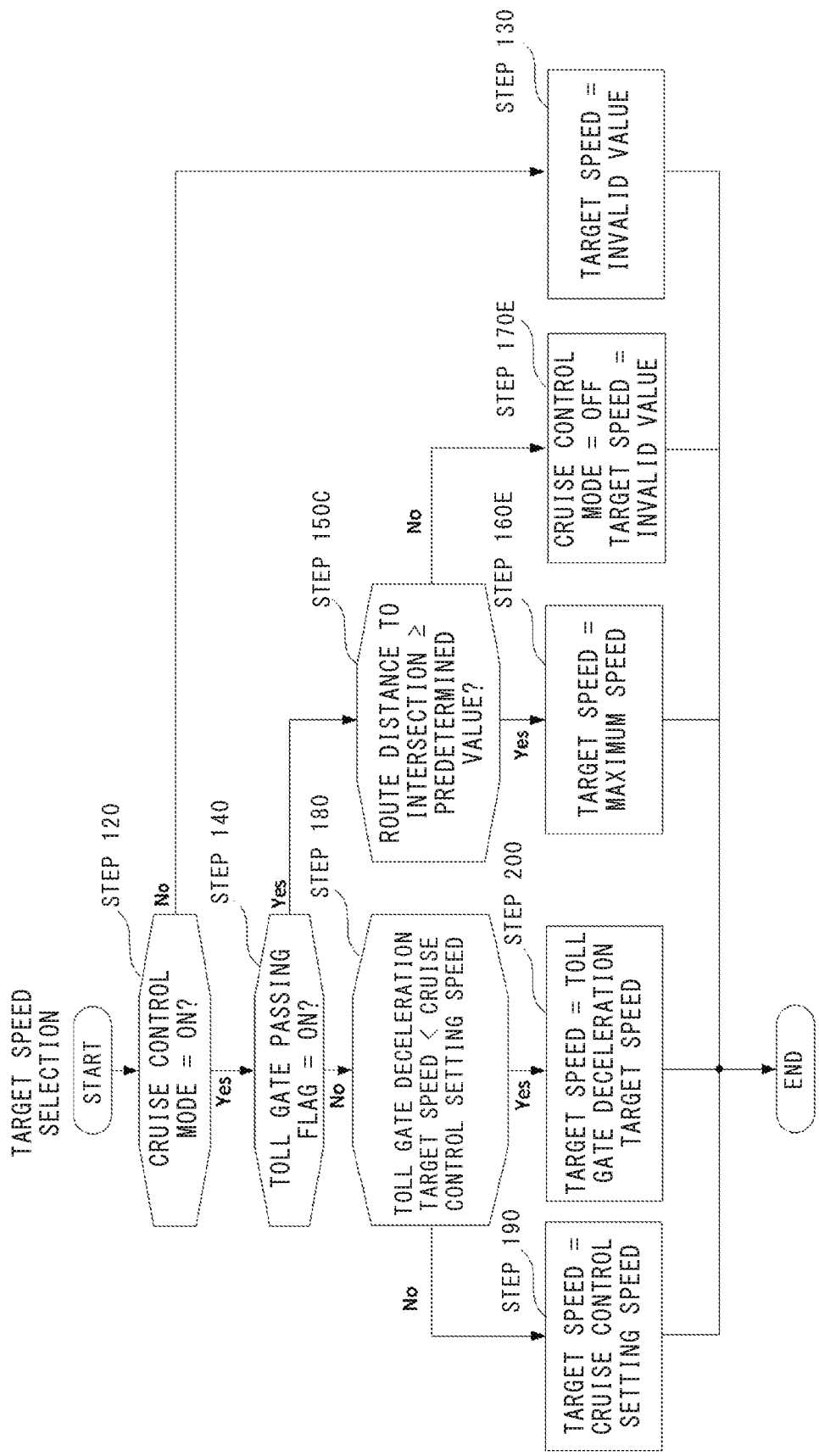
FIG. 14 is a flowchart showing operation of a target speed determining unit of a vehicle control device according to a modification of the fifth embodiment.

FIG. 14 shows a modification of the flowchart shown in FIG. 13. In FIG. 13, if the route distance to the intersection is smaller than the predetermined value, the target speed is set to be lower than the maximum speed on a road after passing through the ETC toll gate. However, as shown in FIG. 14, if the route distance to the intersection is smaller than the predetermined value, the target speed may be set to an invalid value and the vehicle may be switched to a manual traveling state that is based on an acceleration/brake operation by the driver. Also the operation shown in the flowchart in FIG. 14 can provide the same effects as in FIG. 13.

Sixth Embodiment

Figure 15:
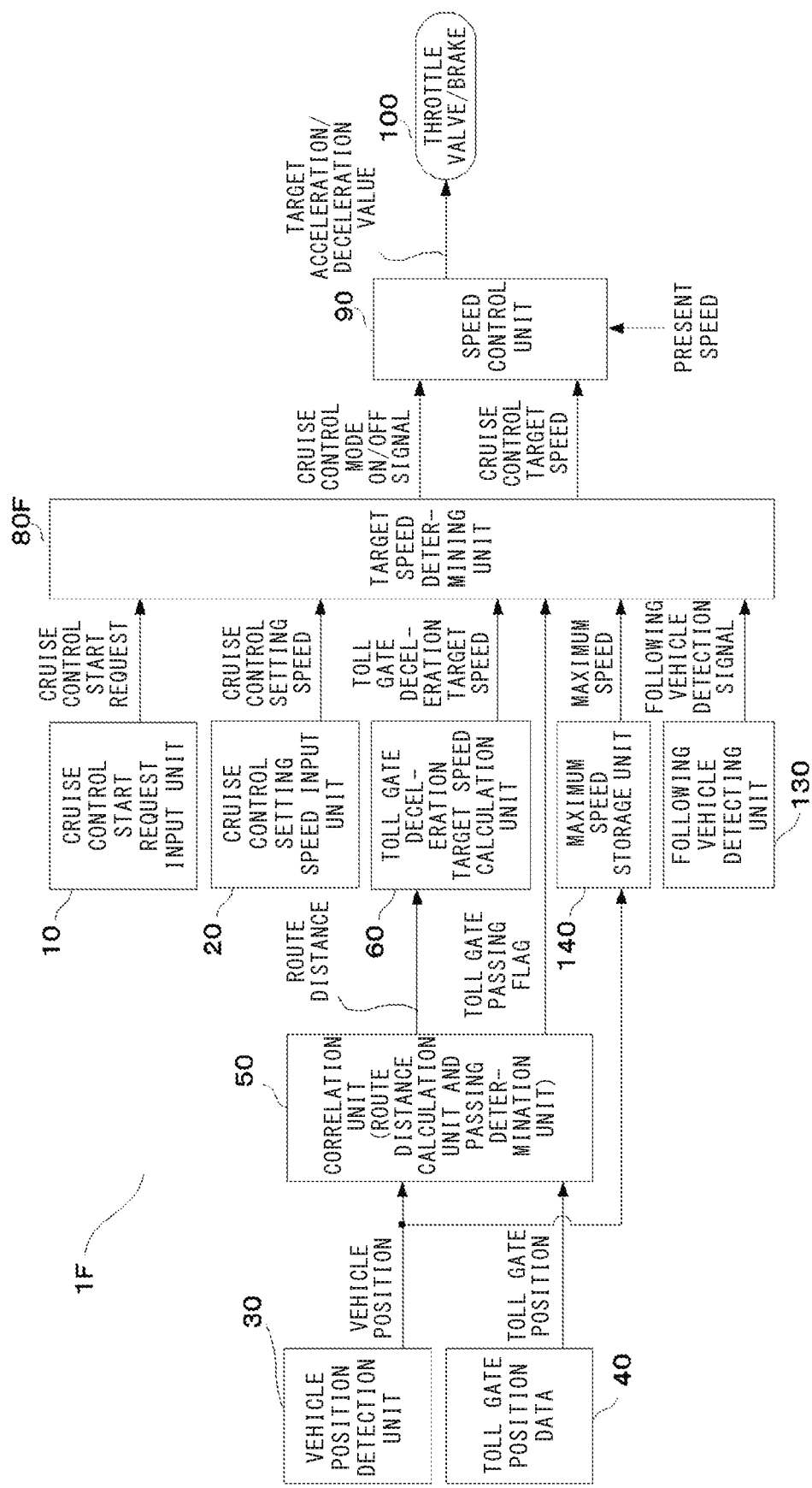
FIG. 15 is a block diagram showing the configuration of a vehicle control device according to the sixth embodiment of the present disclosure.

A vehicle control device 1F according to the sixth embodiment will be described. FIG. 15 is a block diagram showing the configuration of the vehicle control device 1F. In FIG. 15, the components other than a target speed determining unit 80F, the following vehicle detecting unit 130, and the maximum speed storage unit 140 are the same as those in the first to fifth embodiments, and therefore the description thereof is omitted. The maximum speed storage unit 140 corresponds to the vehicle frontward detecting unit in the claims. The following vehicle detecting unit 130 is the same as that shown in FIG. 8, and the maximum speed storage unit 130 is the same as that in the fourth and fifth embodiments. Therefore, the description thereof is omitted.

The target speed determining unit 80F determines the cruise control mode ON/OFF signal and a final cruise control target speed on the basis of a cruise control start request, a cruise control setting speed, a toll gate deceleration target speed, the toll gate passing flag, the maximum speed at the present position of the vehicle, and the following vehicle detection signal. The cruise control start request unit 10, the cruise control setting speed input unit 20, a part of the target speed determining unit 80F, and the speed control unit 90 correspond to the cruise control unit in the claims, and the cruise control mode ON/OFF signal and the final cruise control target speed correspond to the control content in the cruise control unit in the claims. In addition, the toll gate deceleration target speed calculation unit 60, the target speed determining unit 80F, and the speed control unit 90 correspond to the first control unit in the claims, and the target speed determining unit 80F and the speed control unit 90 correspond to the second control unit in the claims. It is noted that, in the case where the cruise control mode ON/OFF signal is OFF, the vehicle is set to a manual traveling state that is based on an acceleration/brake operation by the driver.

Next, operation of the vehicle control device 1F will be described. Operations of the vehicle control device 1F other than step 110 in FIG. 2 are the same as those in the first to fifth embodiments, and therefore the description thereof is omitted. FIG. 16 shows the details of operation in step 110 in the sixth embodiment.

In the flowchart shown in FIG. 16, operations other than steps 150F, 160F to 160H, and 170F are the same as those in the first to fifth embodiments, and therefore the description thereof is omitted. In the vehicle control device 1F, the target speed determining unit 80F refers to the following vehicle detecting unit 130 (step 150F), and if the following vehicle detection signal is ON, i.e., there is a following vehicle, the target speed determining unit 80F confirms the magnitude relationship between the maximum speed on a road after passing through the ETC toll gate and the cruise control setting speed that has been set by the driver before passing through the ETC toll gate (step 160F). If the maximum speed is higher than the cruise control setting speed, the target speed is set to the maximum speed (step 160G). If the maximum speed is lower than the cruise control setting speed, the target speed is set to the cruise control setting speed (step 160H). Thus, constant-speed traveling control is performed by the cruise control unit also after passing through the ETC toll gate. It is noted that, in the case where the following vehicle detection signal is OFF, i.e., there is no following vehicle, the cruise control mode ON/OFF signal is turned off, the target speed is set to an invalid value, and the vehicle is switched to a manual traveling state that is based on an acceleration/brake operation by the driver (step 170F).

As described above, the vehicle control device 1F according to the sixth embodiment performs the following operation. In the case where the cruise control mode ON/OFF signal is ON, constant-speed traveling at a cruise control setting speed and speed control in preparation for the ETC toll gate are performed. Then, when the toll gate passing flag is turned on, if the following vehicle detection signal is ON, i.e., if there is a following vehicle, the magnitude relationship between the maximum speed on a road after passing through the ETC toll gate and the cruise control setting speed that has been set by the driver before passing the ETC toll gate is confirmed. Then, the higher one of both speeds is set as the target speed and constant-speed traveling control is performed by the cruise control unit. If there is no following vehicle, the vehicle is switched to a manual traveling state that is based on an acceleration/brake operation by the driver. Thus, it is possible to perform the vehicle control in accordance with the maximum speed after passing through the ETC toll gate. Therefore, the driver need not control acceleration/deceleration of the vehicle by the driver's operation, load on the driver can be reduced, and the possibility that the vehicle is rear-ended by the following vehicle can be reduced.

It is noted that the following control may be employed. The speed of a following vehicle is detected using the following vehicle detecting unit 130, and as a result, if the speed of the following vehicle is lower than both of the maximum speed and the cruise control setting speed set by the driver, the magnitude relationship between the maximum speed and the cruise control setting speed set by the driver is confirmed, and the lower one of both speeds is set as the target speed, whereby constant-speed traveling control is performed by the cruise control unit. Thus, it is possible to reduce the possibility that the vehicle is rear-ended by the following vehicle, and it is possible to travel at a speed that does not exceed the maximum speed on a road after passing through the ETC toll gate, or a speed in accordance with the driver's intention.

In the fourth to sixth embodiments, the example in which the target speed is set to the maximum speed at the present position of the vehicle has been described. However, as a result of combination with adaptive cruise control (ACC) for maintaining the distance between the vehicle and the preceding vehicle, the target speed may become lower than the maximum speed. In essence, it is required that the speed based on the maximum speed on a road after passing through the ETC toll gate is set as the target speed so as to enable constant-speed traveling control at a speed appropriate for the road after passing through the ETC toll gate.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1A, 1B, 1C, 1D, 1E, 1F vehicle control device
10 cruise control start request input unit
20 cruise control setting speed input unit
30 vehicle position detection unit
40 toll gate position data
50 correlation unit
60 toll gate deceleration target speed calculation unit
70 road type storage unit
80A, 80B, 80C, 80D, 80E, 80F target speed determining unit
90 speed control unit
100 throttle valve/brake
110 lane width calculation unit
120 intersection route distance calculation unit
130 following vehicle detecting unit
140 maximum speed storage unit

What is claimed is:

1. A vehicle control device comprising:
   a cruise controller to cause a vehicle to perform constant-speed traveling at a set speed;
   a detector to detect a position of an electronic toll collection (ETC) toll gate and a route distance from a present position of the vehicle to the ETC toll gate, and determine whether or not the vehicle has passed through the ETC toll gate, on the basis of a result of the detection;
   a first controller to reduce the set speed of the vehicle in accordance with the route distance to pass through the ETC toll gate while the vehicle is performing the constant-speed traveling, until the detector determines that the vehicle has passed through the ETC toll gate;
   a vehicle frontward detector to detect road information about a road frontward of the vehicle, the road information indicating a type of a road after passing through the ETC toll gate; and
   a second controller to change control content in the cruise controller on the basis of a detection result from the vehicle frontward detector, when the detector determines that the vehicle has passed through the ETC toll gate, while the vehicle is performing the constant-speed traveling by the cruise controller,
   when the road information indicates that the type of the road after passing through the ETC toll gate is an expressway, the second controller continues to perform the constant-speed traveling at the set speed before being reduced to pass through the ETC toll gate, and when the road information indicates that the type of the road after passing through the ETC toll gate is not an expressway, the second controller turns off the constant-speed traveling and enters a driver's manual traveling state.

2. The vehicle control device according to claim 1, wherein
   the vehicle frontward detector includes a lane width calculator to detect a lane width of a road frontward of the vehicle,
   the lane width calculator outputs, as the detection result, a lane width of a road after passing through the ETC toll gate, and
   when a difference between the lane width and a vehicle width of the vehicle is equal to or greater than a predetermined value, the second controller changes the control content to constant-speed traveling in which the set speed is used as a target speed, and when the difference between the lane width and the vehicle width is smaller than the predetermined value, the second controller switches the control content to the driver's manual traveling state in which the target speed is set to an invalid value.

3. The vehicle control device according to claim 2, further comprising a following vehicle detector to determine whether or not there is a following vehicle, wherein
   in switching the control content to the driver's manual traveling state in which the target speed is set to an invalid value, if the following vehicle detector determines that there is the following vehicle, the second controller changes the control content to constant-speed traveling in which the set speed is used as the target speed.

4. The vehicle control device according to claim 2, further comprising a following vehicle detector to determine whether or not there is a following vehicle, wherein
the following vehicle detector includes a detector to detect a speed of the following vehicle, and
in switching the control content to the driver's manual traveling state in which the target speed is set to an invalid value, if the following vehicle detector determines that there is the following vehicle, the second controller changes the control content to constant-speed traveling in which the speed of the following vehicle is used as the target speed.

5. The vehicle control device according to claim 1, wherein
the vehicle frontward detector includes an intersection route distance calculator to calculate a route distance from the ETC toll gate to a next intersection on a road after passing through the ETC toll gate,
the intersection route distance calculator outputs, as the detection result, the route distance to the intersection, and
if the detection result is equal to or greater than a predetermined value, the second controller changes the control content to constant-speed traveling in which the set speed is used as a target speed, and if the detection result is smaller than the predetermined value, the second controller switches the control content to the driver's manual traveling state in which the target speed is set to an invalid value.

6. The vehicle control device according to claim 5, further comprising a following vehicle detector to determine whether or not there is a following vehicle, wherein
in switching the control content to the driver's manual traveling state in which the target speed is set to an invalid value, if the following vehicle detector determines that there is the following vehicle, the second controller changes the control content to constant-speed traveling in which the set speed is used as the target speed.

7. The vehicle control device according to claim 5, further comprising a following vehicle detector to determine whether or not there is a following vehicle, wherein
the following vehicle detector includes a detector to detect a speed of the following vehicle, and
in switching the control content to the driver's manual traveling state in which the target speed is set to an invalid value, if the following vehicle detector determines that there is the following vehicle, the second controller changes the control content to constant-speed traveling in which the speed of the following vehicle is used as the target speed.

8. The vehicle control device according to claim 1, further comprising a following vehicle detector to determine whether or not there is a following vehicle, wherein
in switching the control content to the driver's manual traveling state in which a target speed is set to an invalid value, if the following vehicle detector determines that there is the following vehicle, the second controller changes the control content to constant-speed traveling in which the set speed is used as the target speed.

9. The vehicle control device according to claim 1, further comprising a following vehicle detector to determine whether or not there is a following vehicle, wherein
the following vehicle detector includes a detector to detect a speed of the following vehicle, and
in switching the control content to the driver's manual traveling state in which a target speed is set to an invalid value, if the following vehicle detector determines that there is the following vehicle, the second controller changes the control content to constant-speed traveling in which the speed of the following vehicle is used as the target speed.

10. The vehicle control device according to claim 1, wherein
the vehicle frontward detector includes a maximum speed storage storing maximum speeds on roads,
the maximum speed storage outputs, as the detection result, a maximum speed on the road after passing through the ETC toll gate, and
the second controller changes the control content to constant-speed traveling in which a speed based on the maximum speed on the road after passing through the ETC toll gate is used as a target speed.

11. The vehicle control device according to claim 10, wherein
the vehicle frontward detector further includes an intersection route distance calculator to calculate a route distance from the ETC toll gate to a next intersection on the road after passing through the ETC toll gate, and
if the route distance to the intersection is equal to or greater than a predetermined value, the second controller changes the control content to constant-speed traveling in which a first speed based on the maximum speed on the road after passing through the ETC toll gate is used as the target speed, and if the route distance to the intersection is smaller than the predetermined value, the second controller changes the control content to constant-speed traveling in which a second speed lower than the first speed is used as the target speed.

12. The vehicle control device according to claim 10, wherein
the vehicle frontward detector further includes an intersection route distance calculator to calculate a route distance from the ETC toll gate to a next intersection on the road after passing through the ETC toll gate, and
if the route distance to the intersection is equal to or greater than a predetermined value, the second controller changes the control content to constant-speed traveling in which a speed based on the maximum speed on the road after passing through the ETC toll gate is used as the target speed, and if the route distance to the intersection is smaller than the predetermined value, the second controller switches the control content to the driver's manual traveling state in which the target speed is set to an invalid value.

13. The vehicle control device according to claim 10, further comprising a following vehicle detector to determine whether or not there is a following vehicle, wherein
in a case where the following vehicle detector determines that there is the following vehicle,
if the set speed is higher than a speed based on the maximum speed on the road after passing through the ETC toll gate, the second controller changes the control content to constant-speed traveling in which the set speed is used as the target speed, and
if the set speed is lower than a speed based on the maximum speed on the road after passing through the ETC toll gate, the second control unit changes the control content to constant-speed traveling in which the speed based on the maximum speed on the road after passing through the ETC toll gate is used as the target speed.

* * * * *